United States Patent
Johansson et al.

(10) Patent No.: US 9,946,863 B1
(45) Date of Patent: Apr. 17, 2018

(54) STRONG AUTHENTICATION USING AUTHENTICATION OBJECTS

(71) Applicant: Amazon Technologies, Inc., Reno, NV (US)

(72) Inventors: Jesper Mikael Johansson, Redmond, WA (US); Gregory Branchek Roth, Seattle, WA (US); David Matthew Platz, Seattle, WA (US); Rajendra Kumar Vippagunta, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 76 days.

(21) Appl. No.: 14/225,320

(22) Filed: Mar. 25, 2014

(51) Int. Cl.
  *H04L 29/06* (2006.01)
  *G06F 21/36* (2013.01)
  *G06F 3/0484* (2013.01)

(52) U.S. Cl.
  CPC .......... *G06F 21/36* (2013.01); *G06F 3/04842* (2013.01)

(58) Field of Classification Search
  None
  See application file for complete search history.

(56) References Cited

U.S. PATENT DOCUMENTS

| | | | |
|---|---|---|---|
| 4,993,068 A * | 2/1991 | Piosenka | G06F 21/32 235/380 |
| 6,590,568 B1 | 7/2003 | Astala et al. | |
| 6,633,905 B1 | 10/2003 | Anderson et al. | |
| 7,039,951 B1 | 5/2006 | Chaudhari et al. | |
| 7,137,008 B1 * | 11/2006 | Hamid | G06F 21/31 713/182 |
| 7,464,403 B2 | 12/2008 | Hardman, Jr. | |
| 7,757,088 B2 | 7/2010 | Abdulhayoglu et al. | |
| 8,150,769 B2 | 4/2012 | Gupta et al. | |
| 8,424,079 B2 | 4/2013 | Adams et al. | |
| 8,490,868 B1 | 7/2013 | Kropf et al. | |
| 8,554,675 B2 | 10/2013 | Gupta et al. | |
| 8,626,665 B2 | 1/2014 | Bui et al. | |
| 8,788,324 B1 | 7/2014 | Shetty et al. | |
| 8,799,656 B2 | 8/2014 | Brickell et al. | |
| 8,869,235 B2 | 10/2014 | Qureshi et al. | |
| 9,143,319 B2 | 9/2015 | Lambert | |
| 9,143,530 B2 | 9/2015 | Qureshi et al. | |
| 9,202,059 B2 | 12/2015 | Bhansali et al. | |
| 9,250,811 B1 | 2/2016 | Patiejunas | |
| 9,264,419 B1 | 2/2016 | Johansson et al. | |

(Continued)

OTHER PUBLICATIONS

TPM Main, Part 1 Design Principles, Specification Version 1.2, Level 2 Revision 103, Jul. 9, 2007, Published.

(Continued)

*Primary Examiner* — Jeffery Williams
(74) *Attorney, Agent, or Firm* — Davis Wright Tremaine LLP

(57) ABSTRACT

Representations of authentication objects are provided for selection via an interface. An authentication object may be generated to include information proving possession of a user of an item, such as a one-time password token or a physical trait. A selected authentication object may contain information sufficient for authentication with a corresponding system. The interface may provide multiple representations of authentication objects that are usable with different service providers.

25 Claims, 24 Drawing Sheets

(56) References Cited

U.S. PATENT DOCUMENTS

| | | | |
|---|---|---|---|
| 9,270,663 | B2 | 2/2016 | Kravitz et al. |
| 2002/0048369 | A1 | 4/2002 | Ginter et al. |
| 2002/0053021 | A1 | 5/2002 | Rice et al. |
| 2003/0149882 | A1* | 8/2003 | Hamid ............... G06F 21/6218 713/186 |
| 2003/0154406 | A1 | 8/2003 | Honarvar et al. |
| 2003/0163739 | A1 | 8/2003 | Armington et al. |
| 2004/0015702 | A1 | 1/2004 | Mercredi et al. |
| 2004/0044739 | A1 | 3/2004 | Ziegler |
| 2004/0187018 | A1 | 9/2004 | Owen et al. |
| 2004/0193485 | A1 | 9/2004 | Ilberg |
| 2004/0245330 | A1 | 12/2004 | Swift et al. |
| 2005/0077349 | A1 | 4/2005 | Bonalle et al. |
| 2005/0119978 | A1 | 6/2005 | Ates |
| 2005/0149739 | A1 | 7/2005 | Hopkins et al. |
| 2006/0053293 | A1 | 3/2006 | Zager et al. |
| 2006/0156385 | A1 | 7/2006 | Chiviendacz et al. |
| 2007/0234408 | A1 | 10/2007 | Burch et al. |
| 2007/0261109 | A1 | 11/2007 | Renaud et al. |
| 2008/0046982 | A1 | 2/2008 | Parkinson |
| 2008/0115198 | A1* | 5/2008 | Hsu ...................... G06F 21/31 726/5 |
| 2008/0115208 | A1* | 5/2008 | Lee ...................... G06F 21/31 726/19 |
| 2008/0189214 | A1 | 8/2008 | Mueller et al. |
| 2008/0208759 | A1 | 8/2008 | Royyuru |
| 2008/0307223 | A1 | 12/2008 | Brickell et al. |
| 2009/0106680 | A1 | 4/2009 | Brownholtz et al. |
| 2009/0172793 | A1 | 7/2009 | Newstadt et al. |
| 2009/0274384 | A1 | 11/2009 | Jakobovits |
| 2009/0292919 | A1 | 11/2009 | England |
| 2010/0076890 | A1 | 3/2010 | Low et al. |
| 2011/0197070 | A1 | 8/2011 | Mizrah |
| 2011/0213957 | A1 | 9/2011 | Tsai et al. |
| 2011/0219229 | A1 | 9/2011 | Cholas et al. |
| 2012/0039469 | A1 | 2/2012 | Mueller et al. |
| 2012/0144464 | A1 | 6/2012 | Fakhrai et al. |
| 2012/0179915 | A1 | 7/2012 | Horn et al. |
| 2012/0324234 | A1* | 12/2012 | Hamid .................. G06F 21/31 713/183 |
| 2013/0019278 | A1* | 1/2013 | Sun ...................... G06F 21/36 726/2 |
| 2013/0019287 | A1* | 1/2013 | Foley ................... H04L 63/083 726/4 |
| 2013/0024371 | A1 | 1/2013 | Hariramani et al. |
| 2013/0042309 | A1 | 2/2013 | Ozzie et al. |
| 2013/0047232 | A1* | 2/2013 | Tuchman ............. H04L 9/3226 726/7 |
| 2013/0061055 | A1 | 3/2013 | Schibuk |
| 2013/0073672 | A1 | 3/2013 | Ayed |
| 2013/0106916 | A1 | 5/2013 | Guo |
| 2013/0170664 | A1 | 7/2013 | Schwager |
| 2013/0185779 | A1 | 7/2013 | Tamai et al. |
| 2013/0205133 | A1 | 8/2013 | Hess |
| 2013/0219481 | A1 | 8/2013 | Voltz |
| 2013/0339165 | A1 | 12/2013 | Calman |
| 2013/0347089 | A1 | 12/2013 | Bailey et al. |
| 2014/0026124 | A1 | 1/2014 | Gilbert et al. |
| 2014/0033290 | A1* | 1/2014 | Tuchman ............. H04L 9/3226 726/7 |
| 2014/0108792 | A1 | 4/2014 | Borzyski et al. |
| 2014/0115679 | A1 | 4/2014 | Barton et al. |
| 2014/0165150 | A1 | 6/2014 | Brunswig et al. |
| 2014/0219453 | A1 | 8/2014 | Neafsey et al. |
| 2014/0223175 | A1 | 8/2014 | Bhatnagar |
| 2014/0281531 | A1 | 9/2014 | Phegade et al. |
| 2014/0289841 | A1 | 9/2014 | Hagiwara |
| 2014/0337957 | A1 | 11/2014 | Feekes |
| 2015/0089585 | A1* | 3/2015 | Novack ................ H04L 63/08 726/3 |
| 2016/0005032 | A1* | 1/2016 | Yau .................... G06Q 20/3678 705/69 |
| 2016/0094991 | A1 | 3/2016 | Powell et al. |
| 2017/0221056 | A1 | 8/2017 | Karpenko et al. |

OTHER PUBLICATIONS

TPM Main, Part 2 TPM Structures, Specification Version 1.2, Level 2 Revision 103, Jul. 9, 2007, Published.

TPM Main, Part 3 Commands, Specification Version 1.2, Level 2 Revision 103, Jul. 9, 2007, Published.

TPM Main, Part 1 Design Principles, Specification Version 1.2, Revision 116, Mar. 1, 2011, TCG Published.

TPM Main, Part 2 TPM Structures, Specification Version 1.2, Level 2 Revision 116, Mar. 1, 2011 TCG Published.

TPM Main, Part 3 Commands, Specification Version 1.2, Level 2 Revision 116, Mar. 1, 2011, TCG Published.

International Standard ISO/IEC 11889-1, First Edition May 15, 2009, Information Technology—Trusted Platform Module—Part 1: Overview.

International Standard ISO/IEC 11889-1, First Edition May 15, 2009, Information Technology—Trusted Platform Module—Part 2: Design Principles.

International Standard ISO/IEC 11889-1, First Edition May 15, 2009, Information Technology—Trusted Platform Module—Part 3: Structures.

International Standard ISO/IEC 11889-1, First Edition May 15, 2009, Information Technology—Trusted Platform Module—Part 4: Commands.

U.S. Appl. No. 14/225,331, filed Mar. 25, 2014, Authentication Objects with Delegation.

U.S. Appl. No. 14/225,331, filed Mar. 25, 2014.

U.S. Appl. No. 14/318,454, filed Jun. 27, 2014.

U.S. Appl. No. 14/318,466, filed Jun. 27, 2014.

Bhat et al., "Formal Verification of Safety Properties for Ownership Authentication Transfer Protocol," 2013, 16 pages.

Fierrez-Aguilar et al., "Discriminative multimodel biometric authorization based on quality measures," 2004, pp. 777-779.

Microsoft, "authentication," Microsoft Computer Dictionary, 2002, p. 42.

Mostayed et al., "Foot Step Based Person Identification Using Histogram Similarity and Wavelet Decomposition," 2008, pp. 307-311.

Varadharajan et al., "Techniques for assurance of claims," Dec. 2014, 52 pages.

Turajlic, "Neural Network Based Speaker Verification for Security Systems," 20th Telecommunications forum TELFOR 2012, Serbia, Belgrade, Nov. 20-22, 2012, pp. 740-743.

Merriam-Webster, "economic," definition of economic, 2016, 1 page.

\* cited by examiner

STRONG AUTHENTICATION USING AUTHENTICATION OBJECTS

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

To enhance data security, numerous techniques have been developed. For example, the use of username and password combinations has become ubiquitous in various access control contexts. Additional techniques are also often used in addition to or instead of usernames and passwords. A common issue encountered with conventional authentication techniques is the tradeoff between security and usability. For example, passwords are often subject to stringent requirements to cause users to select passwords that are difficult to guess, either by automated processes or human operators. Such requirements may, for instance, require minimum numbers of capital letters, numbers and non-alphanumeric symbols. While such stringent requirements theoretically produce advantages for data security, they often have adverse effects. Stringent requirements, for instance, often make passwords difficult to remember, especially when requirements differ for different systems that each require a password for access. In many instances, users may engage in unsecure behavior to counteract the difficulties encountered in conventional access control systems. Users may, for example, write down or insecurely store passwords as a result of the difficulty of remembering them.

BRIEF DESCRIPTION OF THE DRAWINGS

Various embodiments in accordance with the present disclosure will be described with reference to the drawings, in which.

DETAILED DESCRIPTION

Figure 1:
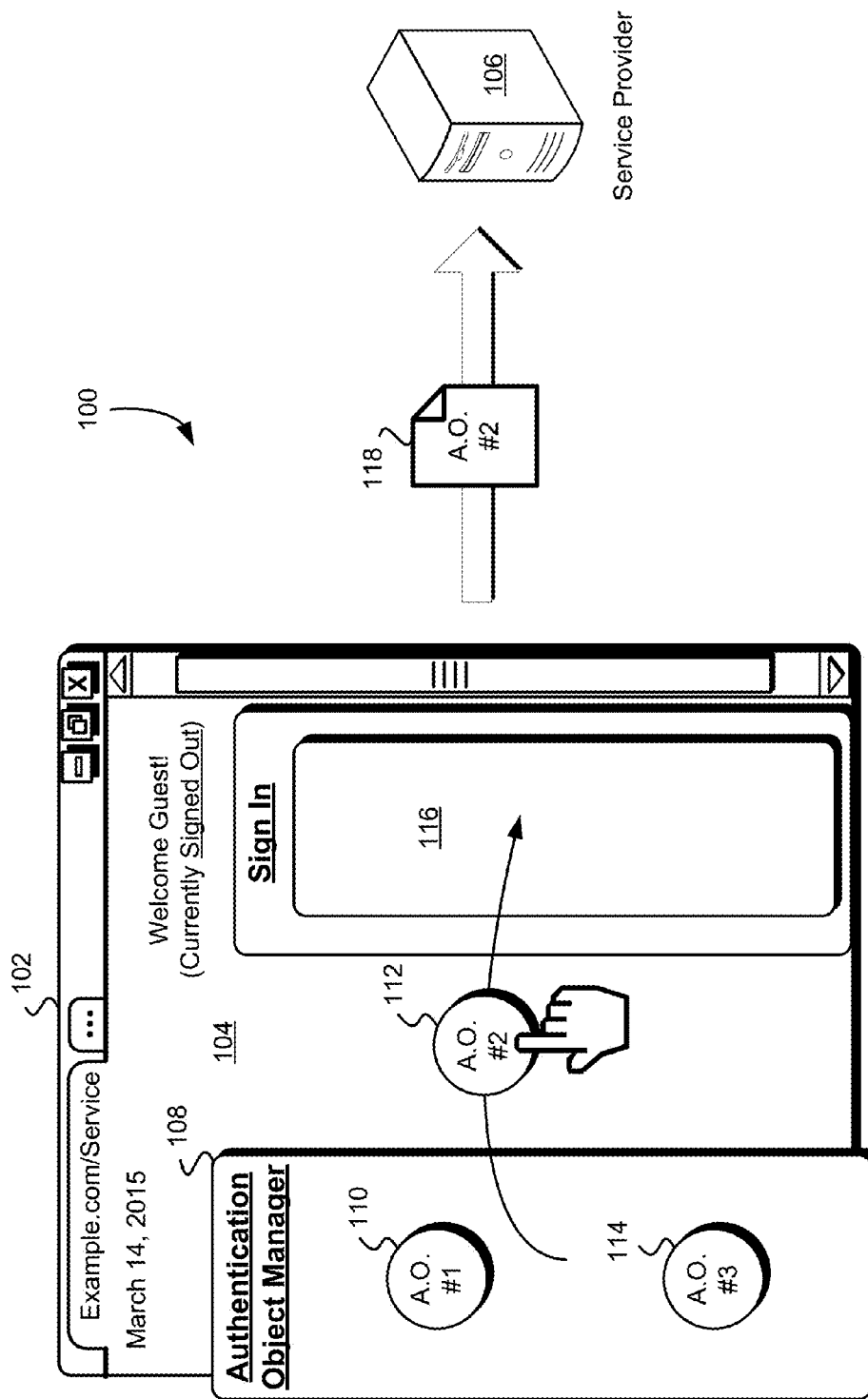
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein allow for increased data security while achieving a better user experience. In some embodiments, a graphical user interface allows for easy use of access credentials to gain access for which providing valid credentials is a prerequisite. For example, a user may utilize the graphical user interface to log in to a website to gain access to information and/or services of the website, although the techniques of the present disclosure are applicable in other contexts where credentials may be required for access (such as for access to functionality of a user interface usable to control home automation features). In some examples, the graphical user interface provides the user the ability to select a representation of an authentication object from a set of authentication objects and indicate that the selected authentication object is to be used for authentication. An authentication object, as described in more detail below, may be a collection of information forming an authentication claim that is necessary and/or sufficient for authentication to a system for which authentication is required for at least some access. As an illustrative example, an authentication object may be an encoding of a username and password combination and possibly other information necessary and/or sufficient for authentication. Other examples of information that may be included in an authentication object are described in more detail below. A representation of an authentication object may be a graphical element or collection of graphical elements of the graphical user interface that corresponds or collectively correspond to the authentication object. In other words, a representation of an authentication object may represent a set of actions for authenticating an identity. The actions, as discussed in more detail below, may include obtaining information for an authentication claim and/or submitting an authentication claim to a service provider. As an example, a representation of an authentication object may be an icon that visually indicates the authentication object. The representation may, for example, be visually distinguishable from other representations on the graphical user interface. It should be noted that while visual representations on a graphical user interface are used throughout for the purpose of illustration, other representations that invoke human senses in addition to or alternatively to sight are also considered as being within the scope of the present disclosure.

As noted above, in various embodiments, a user is able to select a representation of an authentication object from the graphical user interface and indicate, through the same input or separate inputs, that the corresponding authentication object is to be used for authentication. As such, the user may use a representation of an authentication object to authenticate with a system without having to manually input some or all authentication information. As one example, the graphical user interface may be configured such that a drag and drop operation of the representation of the authentication object into a particular area of the graphical user interface can be used to select the representation and indicate that the authentication object is to be used for authentication. As another example, selection of the representation from a drop-down or pop-up menu of the graphical user interface may be used to select the representation and selection of a button corresponding to the menu may be used to indicate that the authentication object is to be used for authentication. Generally, numerous ways of selecting a representation of an authentication object and indicating that the authentication object is to be used for authentication are considered as being within the scope of the present disclosure. Further selection of the representation of the authentication object and indicating that the authentication object is to be used for authentication may be performed as a single operation where selection of the representation simultaneously serves to indicate that the authentication object is to be used for authentication.

Once an authentication object has been selected (e.g., by selection of the authentication object's representation in a graphical user interface), the authentication object may be provided to a system for which the authentication object is sufficient and/or necessary for authentication. In some embodiments, the selected authentication object is configured to be provided prior to selection of the authentication object. For example, the authentication object may be stored in memory of a computer system providing the graphical user interface and accessed from memory to be provided for authentication. In some embodiments, the authentication object is generated after a user indicates that the authentication object is to be used for authentication, such as by selecting a corresponding representation of the authentication object. To generate the authentication object (either before or after a user indicates that the authentication object is to be used for authentication, as appropriate for the particular embodiment being implemented), information may be obtained and the obtained information may be used to generate the authentication object.

In some embodiments, the authentication object is generated to be cryptographically verifiable by the system to which the authentication object is to be provided or another system that operates in conjunction with the system to which the authentication object is to be provided. For example, the authentication object may be encrypted so as to be decryptable by the system that will cryptographically verify the authentication object, where the ability to decrypt the authentication object serves as cryptographic verification of the authentication object. As another example, the authentication object may be digitally signed (thereby producing a digital signature of the authentication object) such that the digital signature is verifiable by the system that will cryptographically verify the authentication object. In other examples, both encryption and digital signatures are used for cryptographic verifiability (and security). The key used to encrypt and/or digitally sign the authentication object may vary in accordance with various embodiments and the same key is not necessarily used for both encryption and digital signing, where applicable. In some embodiments, a key used to encrypt an authentication object is a public key of a public/private key pair where the private key of the key pair is maintained securely by the system to which the authentication object is to be provided, thereby enabling the system to decrypt the authentication object using the private key of the key pair. Using the public key to encrypt the authentication object may include generating a symmetric key, using the symmetric key to encrypt the authentication object, and encrypting the symmetric key using the public key, where the encrypted symmetric key is provided to a system with the encrypted authentication object to enable the system to use the corresponding private key to decrypt the symmetric key and use the decrypted symmetric key to decrypt the authentication object. Further, in some embodiments, the authentication object is digitally signed using a private key of a public/private key pair corresponding to the computer system that encrypts and/or digitally signs the authentication object (e.g., the user's computing device). For example, an application that manages authentication objects may be provisioned with the private key and the authentication object may include a certificate for the private key for use by a system for verification of the digital signature of the authentication object. Other variations, including variations where a symmetric key shared between the user's computer system and the system that cryptographically verifies the authentication object is used to encrypt and/or digitally sign the authentication object.

As noted, various types of information may be obtained to generate the authentication object. Such information may include authentication credentials, such as a username and password and/or information derived therefrom (e.g., a hash of a username and/or password) and/or other credential information. In some embodiments, the information obtained includes an attestation to the state of a computing environment in which the authentication object is selected. For example, the attestation may indicate that an authentication object manager application is unaltered, that a computer system on which the application object manager executes has a particular anti-virus software application installed, that the anti-virus software application has received a recent update, that an operating system of the computer system has had a particular update applied, or otherwise that the computer system of the authentication object manager is in a state in which the computer system is required to be in for the authentication object to be successfully used.

Further, in some embodiments, the information obtained includes an attestation to one or more sensor measurements that have been made by one or more sensors of the device on which the authentication manager application is executed. For example, the attestation may indicate that an accelerometer has measured at least a threshold amount of movement over a time period. As another example, an attestation may indicate that a global positioning service (GPS) sensor has been used to determine a particular location of a device, such as through the use of GPS coordinates in the attestation. Attestations to data collected using one or more other sensors including, but not limited to, microphones and cameras are also considered as being within the scope of the present disclosure.

In some embodiments, authentication objects are used to distinguish human users (human operators) from automated agents (often referred to as bots), such as automated agents that, in an automated fashion, transmit and receive information to navigate a website for various purposes, such as the collection of information from the website. For example, an authentication object may encode a solution to a test (puzzle) configured to be easier for human users to solve than for automated agents. The test may be, for example, a completely automated public Turing test to tell computers and humans apart (CAPTCHA) test. In some embodiments, a user is able to interact with a user interface to input a solution to a test and perform a drag and drop operation of a proposed solution to the test to submit the proposed solution. The proposed solution may be encoded in an authentication object with additional information, such as described above. In this manner, systems relying on such tests may utilize the enhanced usability provided by authentication objects while still being able to mitigate the effects of automated agents.

FIG. 1 shows a diagram 100 illustrating various aspects of the present disclosure. In the illustrated embodiment, the diagram 100 shows a graphical user interface generated by an application which, in this example, is an interface of a browser application 102, although other types of applications may provide a graphical user interface. The browser application may be executed on a computing device such as a personal computer, notebook computer, tablet computer, mobile phone or other device. Executable code for generating the graphical user interface may be application code stored locally on a device executing the application or, as typical with browser applications, the code may be generated remotely and transmitted to the device executing the application to be executed with the code of the browser application. It should be noted however that various aspects of the present disclosure are applicable to other types of interfaces and are not limited to those provided through browser applications. For example, techniques of the present disclosure may be utilized in connection with mobile applications on a mobile device that utilizes network communications. In the illustrative example of FIG. 1, the browser application displays a web page 104 provided by a service provider 106. The service provider 106 may for example operate a collection of computing devices, including one or more web servers, to provide the web page 104 to various users. The service provider 106 may transmit the web page 104 in the form of one or more hypertext markup language (HTML) documents or other documents or collection of documents that are processed by the browser application 102 to display the web page 104 on a display device of a computer system on which the browser application 102 is executed.

As illustrated in FIG. 1, an authentication object manager 108 is displayed with the browser application 102 (i.e., a display corresponding to execution of the authentication object manager 108 is shown with a display corresponding to execution of the browser application 102). The authentication object manager 108, as discussed in more detail below, may be implemented in various ways in accordance with various embodiments. For example, the authentication object manager 108 may be an application, separate from the browser application 102, executing on the computer system that executes the browser application 102. In some examples, the authentication object manager 108 is a plugin application of the browser application 102 and configured to operate in conjunction with the browser application 102, such as described in more detail below. As illustrated in FIG. 1, in an embodiment, the authentication object manager 108 provides access to a set of authentication objects. To do this, as illustrated in FIG. 1, the authentication object manager, for one or more authentication objects, provides for display of a representation of an authentication object to which access is provided. As illustrated in FIG. 1, for example, the authentication object manager 108 provides for display representations 110, 112, 114 of corresponding authentication objects.

An authentication object, in an embodiment, is a collection of information sufficient and/or necessary for access to one or more service provider systems. The information for example may comprise credentials usable for access to a service provider system. In one example, an authentication object encodes a username and a password where the username and password are sufficient for access to the service provider system. In this example the username and password may be credentials of a user on behalf of whom the authentication object is presented, such as described in more detail below. In other embodiments an authentication object may encode credentials not of the user, but of the authentication object manager, where one or more processes have been performed to enable the service provider system to associate credentials of the authentication object manager 108 with credentials of a user, thereby enabling the authentication object manager 108 to authenticate on behalf of the user. In this manner, an authentication object presented to the service provider 106 may encode one or more credentials of the authentication object manager and, by virtue of those credentials being valid, the service provider may allow the user to obtain access to information provided by the service provider 106.

In some embodiments, each authentication object 110, 112, 114 is usable for authentication with a different service provider. To authenticate with a particular service provider, a user may select a representation of an authentication object corresponding to that service provider. Multiple different authentication objects may be used with the same service provider, in some embodiments. In some examples, different authentication objects are usable for different types of access to a system of a service provider. A first authentication object may, for instance, be usable for general authentication. A second authentication object may be usable to complete a commercial transaction (e.g., purchase of one or more items offered for consumption in an electronic marketplace). A third authentication object may be usable to change a password and/or other account settings. Other examples are also considered as being within the scope of the present disclosure.

Further, in some embodiments, authentication objects associated with one service provider may be usable with other service providers. For instance, an authentication object associated with a social networking service may be usable with a provider of an electronic marketplace to enable a user to link a marketplace account with a social network account without being burdened with having to enter credentials for both providers at the time the user directs the link to be established. As yet another example of variations considered as being within the scope of the present disclosure, an authentication object manager may be configured with programming logic to detect what authentication objects are usable with a particular service provider, select those authentication objects from a set of authentication objects that includes one or more authentication objects unusable with the service provider, and provide representations of the selected authentication objects (excluding the unusable authentication objects) to make user identification of a suitable authentication object easier.

Other variations include embodiments where authentication objects are aggregated into a single object, such as by aggregating the information contained in the individual authentication objects and/or by wrapping individual authentication objects in another authentication object. Such embodiments may be used, for example, instances where credentials for multiple providers are needed, such as the example above regarding linking accounts of different providers.

As illustrated in FIG. 1, in various embodiments, the authentication object manager allows for user selection of a representation of an authentication object and for indication of the selected authentication object to be used for authentication. In the particular illustrative example of FIG. 1, a user has selected a representation 112 of an authentication object thereby selecting the corresponding authentication object. In this example, the user may indicate that the selected authentication object corresponding to the selected representation 112 is to be used for authentication by performing a drag and drop operation from an area of the display of the authentication object manager 108 to an area 116 of the web page 104 usable for authentication. The drag and drop operation may be performed, for example, by placing a cursor on the representation 112 holding a mouse button, such as a left mouse button should a mouse device have two buttons, and moving the mouse so that the representation 112 moves on the display from the authentication object manager 108 to the area 116 for authentication, and releasing the button when the representation 112 is at least mostly within the area 116. It should be noted, however, that the particular method by which authentication objects are selected and indicated for use in authentication may vary in accordance with various embodiments and in accordance with the various types of interfaces used. For example, in some embodiments interaction with a touch screen may cause a representation of an authentication object to be moved from the authentication object manager 108 to the area 116 for authentication. As another example, the authentication manager may provide representations in the form of a drop down list, popup menu or other graphical user interface element that enables selection of the representation. Generally, any way by which a representation of an authentication object may be selected and indicated for use in authentication may be used and the scope of the present disclosure is not limited to those particular embodiments illustrated in the figures and described in connection therewith.

Turning back to the illustrative example shown in FIG. 1, the drag and drop operation of the representation 112 of the authentication object to the area 116 for authentication causes the browser application 102 to send the corresponding authentication object to the service provider 106. The service provider, as discussed in more detail below, may verify information contained in the authentication object 118 and provide access for which presentation of the authentication object 118 is sufficient.

As with all specific embodiments illustrated and discussed herein, variations are considered as being within the scope of the present disclosure. For example, the figures extensively provide examples where representations of authentication objects are graphical representations. Representations may be provided in other forms in accordance with various embodiments. For example, a user interface may provide an audio representation of an authentication object where the audio representation may comprise one or more sounds usable to identify a corresponding authentication object. As another example, a tactile interface may provide a tactile representation of an authentication object where tactile features of the representation are usable to distinguish the authentication object from other tactile representations of other authentication objects. Generally, any way by which an interface may utilize one or more senses of a user to distinguish representations of authentication objects from each other may be used. Generally, a representation of an authentication object may invoke one or more senses of the user. Other variations are also considered as being within the scope of the present disclosure.

Figure 2:
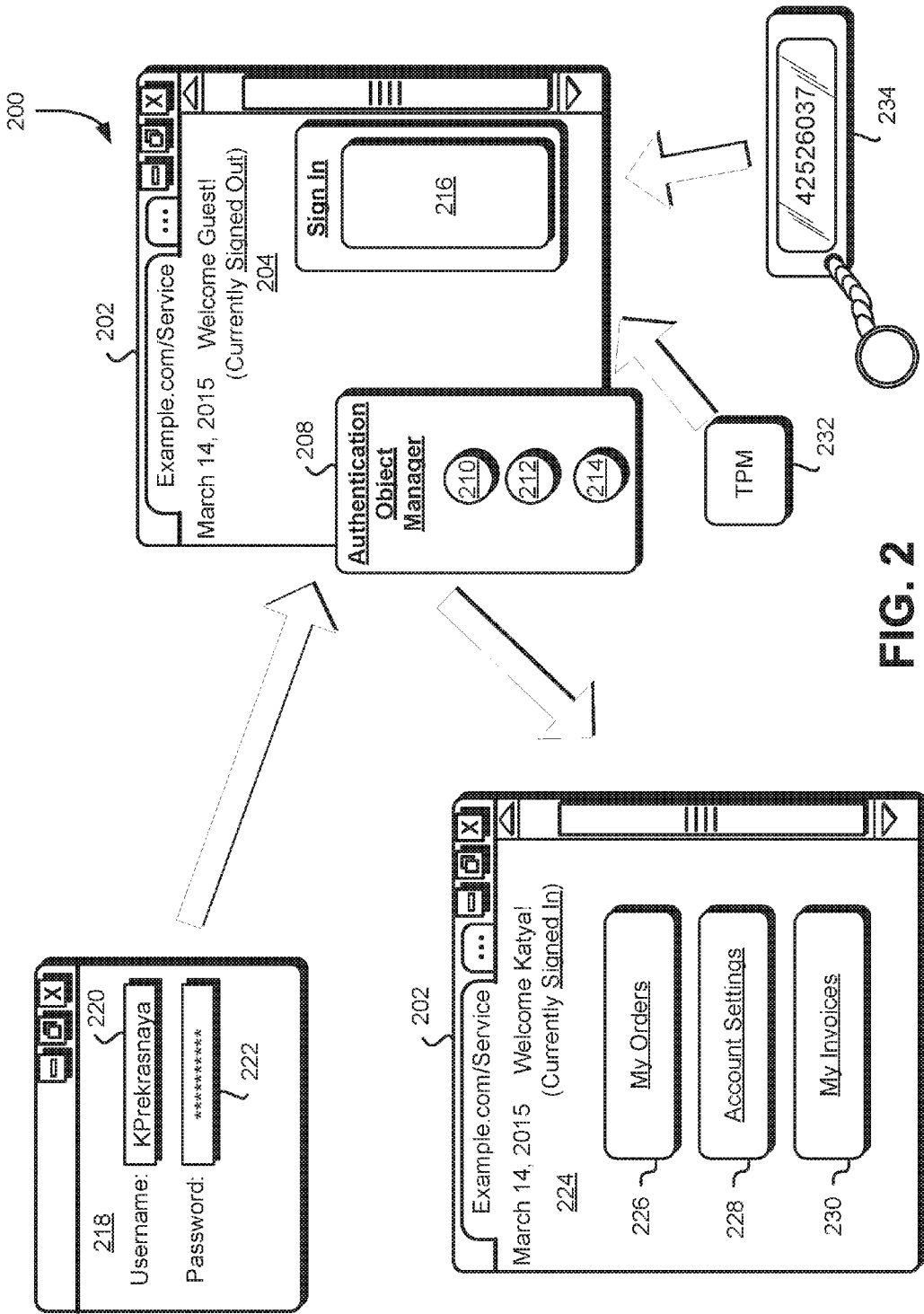
FIG. 2 shows another diagram illustrating various aspects of the present disclosure.

In various embodiments of the present disclosure, access to the functions of an authentication object manager is subject to restrictions. For example, in some embodiments, an authentication object manager is configured to not provide access to authentication objects unless valid credentials have been presented to the authentication object manager or until a user has otherwise provided proof to the authentication object manager that the user has the requisite credentials and/or otherwise satisfies one or more requirements programmed into the authentication object manager. FIG. 2, accordingly, shows an illustrative example of a diagram 200 illustrating various aspects of the present disclosure whereby access to an authentication object manager is restricted. In the diagram 200, a browser application 202 is presented, which may be the same browser application as discussed above in connection in FIG. 1. Further, as with all techniques described herein, the techniques while described in connection with a browser application are applicable to other applications. In the example of FIG. 2, the browser application 202 displays a web page 204 on which an authentication object manager 208 is superimposed, such as described above. The authentication object manager may provide access to authentication objects through representations 210, 212, 214 of the authentication objects. As described above in connection with FIG. 1, a representation of an authentication object may be selected and indicated for use in authentication through a drag and drop operation from the authentication object manager 208 to an area 216 of the display for authentication.

In various embodiments, as noted, access to authentication objects managed by the authentication object manager 208 requires the presentation of credentials such as a username and password for the authentication object manager 208. FIG. 2, accordingly, shows an illustrative example of an interface 218 that allows for the input of credentials for providing access to functionality of the authentication object manager 208. The example interface 218 may appear in various ways in accordance with various embodiments. In some embodiments, for example, the interface 218 may appear instead of the authentication object manager 208 in the display of the browser application 202. As another example, the interface 218 may be part of a login screen to the authentication object manager presented separately from the browser 202. In yet another example, the interface 218 may be part of a login screen of an operating system where successful authentication (i.e., presentation of valid credentials) is a requirement for access not only to the authentication object manager, but to other applications. The interface 218 may be a component of a browser plug-in application or an application separate from the browser. In another example, the interface 218 may be provided by a website provided remotely from the device on which the interface 218 is displayed. The website may be, for example, a component of a system that manages authentication objects remotely for users as a service. Other variations are also considered as being within the scope of the present disclosure.

In this example illustrated in FIG. 2, as noted, the interface 218 is configured to enable the input of credentials sufficient for access to functionality of the authentication object manager 208. In this example, the interface 218 includes a username field 220 and a password field 222 which, in this example, are graphical user interface elements that enable a user to enter (e.g., via a virtual or physical keyboard) alphanumeric input corresponding to respectively a username and password. As with all embodiments described herein, variations that utilize different credentials or additional credentials are also considered as being within the scope of the present disclosure.

In an embodiment, the authentication object manager 208 is configured to provide access to authentication objects represented by the representations of the authentication objects 210, 212 and 214 only after valid credentials have been input using the interface 218. Thus, once the interface 218 has been used by the user to provide valid credentials, the user may utilize the authentication object manager 208 to select a representation of an authentication object and indicate that the selected representation should be used for authentication. In this particular example, the authentication object manager 208 is configured to provide the user an ability to select a representation of an authentication object usable to access functionality of a website of which the web page 204 is a part. Accordingly, having selected a representation of an authentication object corresponding to valid credentials for the website, a system providing the website may enable access to another web page 224 of the website through which the functionality is accessible. For instance, the web page 224 illustrated in FIG. 2 includes user interface elements (buttons, in this example) which are selectable to obtain account specific information that would otherwise not be accessible had valid credentials not been provided either through the authentication object manager 208 or otherwise such as through manual entry of a username and password in appropriate fields for the website.

Information provided to the system that provides the website may also include additional information, much of which is described below with more detail. For example, the authentication object manager 208 may utilize information from a trusted platform module 232 of the computing device on which the browser application 202 executes. The trusted platform module 232 may, for example, provide an attestation to the state of the computing environment in which the browser application 202 executes. Other information, such as additional credential information, may be utilized by the authentication object manager 208. In some embodiments, proof of possession by the user of an item for which possession by the user is necessary according to at least one mode of authentication with the service provider. Such proof, for instance, may comprise a one-time password (OTP) obtained from a one-time password token, which may be a separate device from the computer device on which the browser application 202 executes or which may be integrated into the computing device. Other information, such as a personal identification number (PIN), other personal identifying information (e.g., demographic information), and, generally, additional information input by a user or otherwise obtained to increase security and prevent unauthorized use of an authentication object manager to authenticate using authentication objects may be used.

Figure 3:
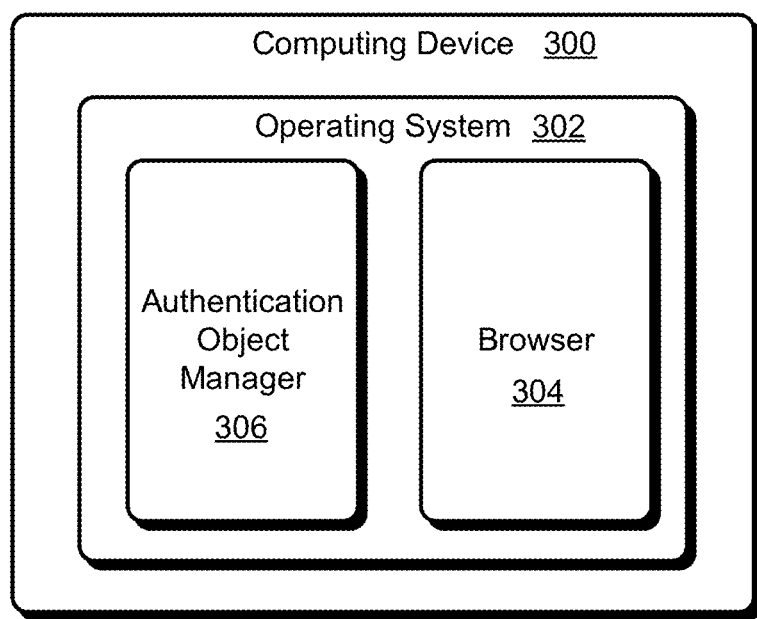
FIG. 3 shows a diagram illustrating a configuration of a computer device in accordance with at least one embodiment.

As noted above, authentication object managers may be implemented in various ways in accordance with various embodiments. FIG. 3, accordingly, shows an illustrative example of a computing device 300 and how the computing device 300 may be used to implement an authentication object manager. The computing device 300 in an embodiment is any suitable computing device such as personal computers, notebook computers, tablet computers, mobile devices and generally any devices with suitable computational abilities combined with the ability of communication over a network. In an embodiment, the computing device 300 is operated using an operating system 302, which in an embodiment is a collection of executable instructions that the computing device 300 operates in accordance with for the purpose of management of hardware resources and to provide various services for applications executing on the operating system 302. Example operating systems include but are not limited to versions of Unix, OS X, Linux, Google Chromium, Microsoft Windows, IOS, Android and others.

Example applications utilizing the operating system 302 include a browser application 304, an authentication object manager 306 for the browser 304 and authentication object manager 306 may be applications such as described above. Suitable browser applications include, but are not limited to Microsoft Internet Explorer, Google Chrome, Safari, Opera and Mozilla Firefox and all variations thereof. The computing device 300 may support other applications, including those not illustrated in FIG. 3, such as other applications which operate in conjunction with the authentication object manager 306, where such applications may require credentials for access to local and/or remote resources.

Figure 4:
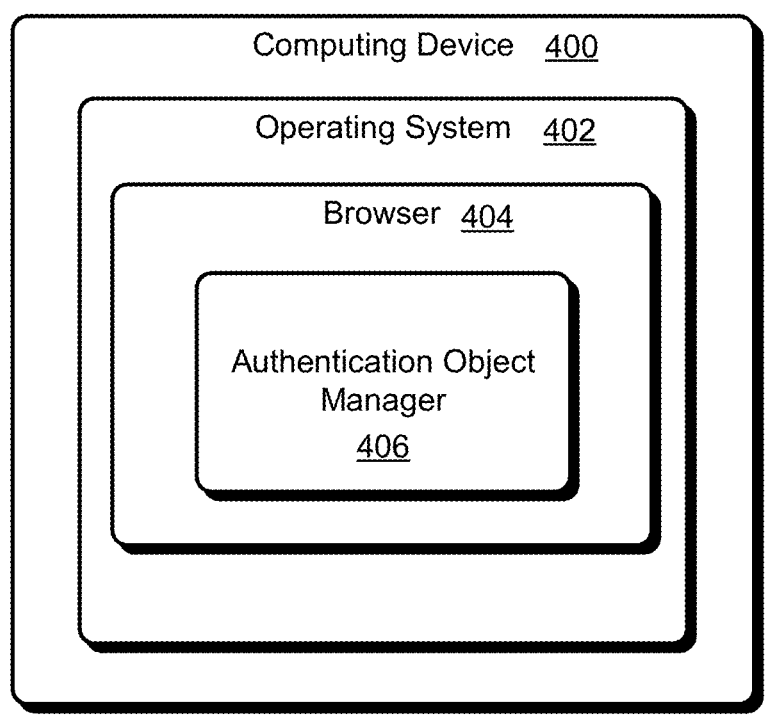
FIG. 4 shows a diagram illustrating a configuration of a computing device in accordance with at least one embodiment.

FIG. 4 shows an alternative to the embodiment shown in FIG. 3, where a computing device 400 includes an operating system 402, such as described above where the operating system 402 is used to implement a browser application 404. An authentication object manager may be implemented as a component 406 of the browser application 404, such as a plug-in or other module integrated with the browser application 404. In this manner, the authentication object manager has greater integration with functionality of the browser to enable users to select authentication objects for use in authentication.

It should be noted that variations of the embodiments illustrated in FIG. 3 and FIG. 4 are considered as being within the scope of the present disclosure. For example, various embodiments may utilize one or more virtualization layers which are not illustrated in FIGS. 3 and 4. In addition, other embodiments may have an authentication manager as a component of an operating system. As yet another variation, the scope of the present disclosure extends to computing environments where browser functionality is implemented in a distributed system.

For example, a browser may be implemented remotely from a user, such as through a remote desktop implementation. As another example, a browser application may utilize a split architecture where at least a portion of webpage rendering and request submission is processed remotely from the user, such as with an Amazon Silk Browser. As yet another example, an authentication manager may operate on a first device separate from a second device with an application used to gain access (e.g., to a service provider system). By selection of a valid authentication object using an interface of the first device, access may become available using the second device. Such functionality may be achieved in various ways, such as by transmission of the authentication object from the first device to the second device over a short-range or other communication channel, thereby enabling the second device to submit the authentication object for authentication, possibly without user input to the second device by the user. The short-range communication channel may be established using various technologies, such as induction wireless, infrared wireless (such as technologies operating according to specifications and protocols provided by the Infrared Data Association, or IrDA) or ultra wideband formats. In some embodiments, the first and second devices may utilize short-range, low-power and high-frequency radio transmissions, such as Bluetooth®. In still other embodiments, the first and second devices may support acoustic-based data transfer. For example, the first device may include software components and a speaker that enable the first device to broadcast data to the second device as sound waves, while the second device may include software components and microphone that enable the second device to receive the data embedded in the sound waves. Thus, one or more of radio signal-based data transfer (e.g., near field communication (NFC) or Bluetooth®), light-based data transfer (e.g., infrared data transfer), an acoustic-based data transfer (e.g., sound wave-embedded data), or magnetic field-based transfer (e.g., reading data from a magnetic stripe) may be used for inter-device communication. The protocols and components for enabling computing devices to perform the systems and methods of the present disclosure using such means for inter-device communication are well known to those skilled in the art of computer communications and thus, need not be described in more detail herein. Generally, embodiments described herein are not limited to those explicitly illustrated herein.

Figure 5:
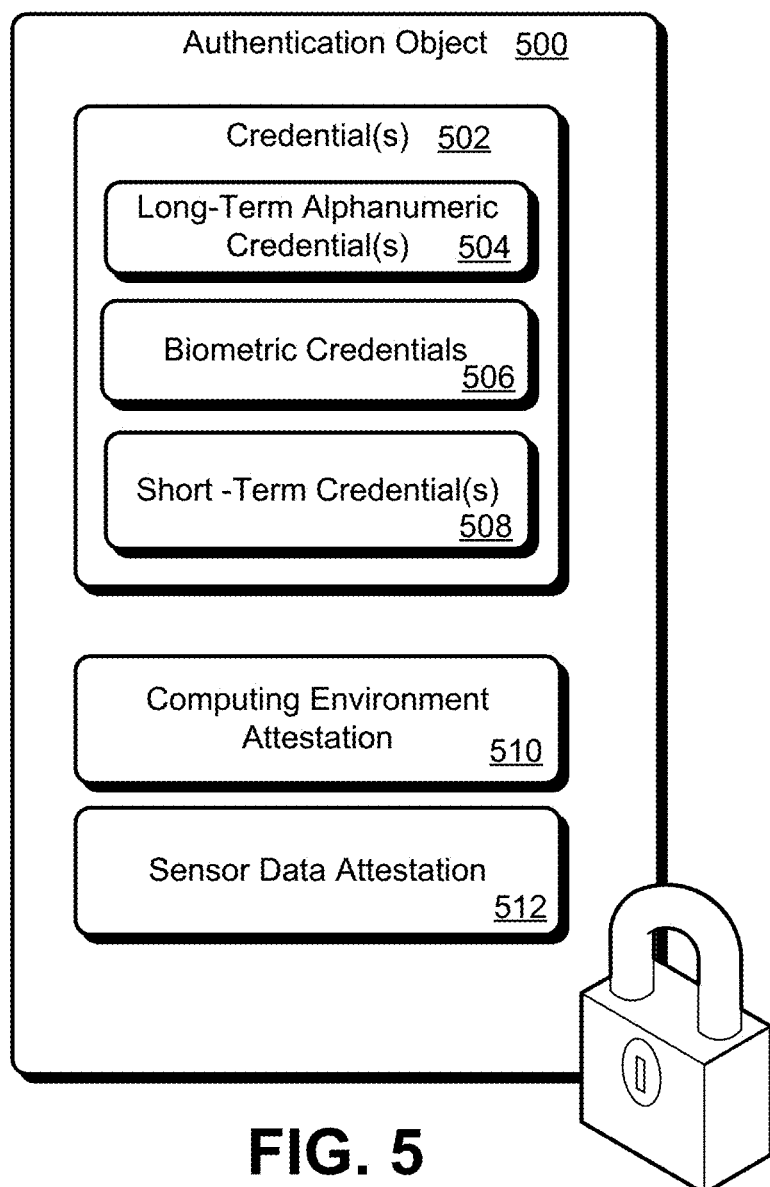
FIG. 5 shows a diagram illustrating a configuration of an example authentication object in accordance with at least one embodiment.

As noted, authentication objects may be configured in various ways in accordance with various embodiments. FIG. 5, accordingly, shows an illustrative example of an authentication object and information that may be contained therein in accordance with various embodiments. An authentication object, in an embodiment, is a structured collection of information forming an authentication claim sufficient for authentication to one or more systems to which the authentication object corresponds. The authentication object may include authentication information in a structured format utilizing, for example, a structured markup language, such as extensible markup language (XML), JavaScript object notation (JSON), although other encodings of authentication objects are considered as being within the scope of the present disclosure. Generally, any way by which information may be encoded, in a structured or unstructured manner, may be used and the manner by which information and authentication objects are encoded may vary in accordance with the various systems to which the authentication objects are submitted for authentication. One system, for example, may require and/or treat as sufficient a first format, where a second system may require and/or treat as sufficient a different format with different information. Some systems may be configured with the ability to process unstructured information by determining if an authentication object contains information sufficient for authentication.

In the embodiment illustrated in FIG. 5, an authentication object 500 includes one or more credentials sufficient for accessing a system to which the authentication object corresponds. It should be noted that a single authentication object may be usable for authentication with multiple different systems which may be managed and operated by different entities. In some examples, credentials 502 contained within an authentication object 500 include long term alphanumeric credentials 504 corresponding to an identity. Long term alphanumeric credentials may comprise, for example, one or more of a username, password, electronic mail address, PIN, telephone number, physical mailing address, network address, or other identifier or collection of identifiers that collectively uniquely map to an account of a system for which the authentication object 500 is submittable. In some embodiments, instead of a long-term credential being included directly in the authentication object 500, the authentication object 500 includes information generated based at least in part on one or more long term credentials, such as one or more hash values of one or more long term credentials. Thus, regardless of whether the authentication object includes a long term credential or information derived therefrom, the authentication object, in this example, has information based at least in part on the long term credential. Long term credentials and information derived therefrom may, in some embodiments, may be included in the same authentication object. For example, an authentication object may include a username and a hash of a password. Credentials 502 of an authentication object 500 may also include biometric credentials 506. Example biometric credentials include, but are not limited to, instances of information encoding one or more fingerprints, one or more retinal scans, deoxyribonucleic acid (DNA), a human voice, an image of a face, typing cadence and others. Biometric credentials 506 generally may comprise information suitable for use in a biometric authentication system. The information may, for example, be an optical and/or capacitance scan of one or more fingerprints or information obtained by processing a scan of one or more fingerprints. Similarly, an image of a face or information obtained from processing an image of a face may be used. Generally, the type of biometric information and the manner in which it is included in the authentication object may depend from the capabilities of the system to which the authentication object is submittable.

In an embodiment an authentication object 500 includes one or more short-term credentials 508. A short-term credential may be a credential that, due to a limited lifetime, is required to be presented to an authentication object manager within a limited amount of time before generation of the authentication object 500. Upon selection of a representation of the authentication object 500, for example, an authentication object manager may obtain the one or more short-term credentials 508 for inclusion in the authentication object 500. As discussed above, example short-term credentials include an OTP code obtained from an OTP token such as described above. Example OTP tokens include token devices produced by the EMC Corporation (e.g., RSA SecurID tokens) and tokens produced by Gemalto NV. OTP tokens may also be integrated into a device that provides authentication objects, such as a user computing device and information may be obtained therefrom accordingly. Another example of a short-term credential is a cryptographically verifiable time stamp from a time server. Generally, a short-term credential may be any credential valid for an amount of time determined as short and, as a result, the use of short term credentials adds an additional layer of security in that the amount of time a compromised short-term credential is valid is limited, thereby preventing security breaches and/or the effects of security breaches.

In various embodiments, an authentication object 500 includes one or more attestations. The one or more attestations may be attestations to various facts which are required to be true for authentication using the authentication object 500 to be successful. As an example, an authentication object 500 may include a computing environment attestation 510 attesting to the integrity of the computing environment and/or the integrity of one or more components of the computing environment. An attestation to a computing environment may include information encoding the state of one or more components associated with an authentication object manager that manages the authentication object 500. For example, the computing environment attestation 510 may indicate that the computing device on which the authentication object manager operates has a particular serial number or other identifier, is connected to a particular network, that the computing device has particular anti-virus software running, that the anti-virus software has been updated within some time defined as recent and/or has received an update with a specified identifier, that an operating system on which the authentication object manager operates has received a particular software patch, that executable code of the authentication object manager or other executable code has been unmodified (or, generally, that the executable code is in an approved state), that the device on which the authentication object manager operates has one or more required security features (e.g., remote wipe) enabled and/or other information about the computing environment in which the authentication object manager operates. In some examples, the computing environment attestation 510 in an authentication object 500 includes information about other devices different from the device that presented and/or generated the authentication object 500. For instance, in some embodiments, multi-factor authentication requires cryptographically verifiable information from two or more separate authentication object managers, each operating on a different device (e.g., a user's personal computer and the user's mobile device where both have been registered to the owner in a system that verifies authentication objects). Accordingly, the computing environment attestation may include cryptographically verifiable information from multiple authentication object managers to enable authentication determinations.

As illustrated in FIG. 5, an authentication object 500 may also include sensor data attestation 512. Sensor data attestation may be an attestation to measurements made by one or more sensors of a computing device on which the authentication object manager is operating or generally any device which may be a different device for which the authentication object manager can verify sensor measurements. As an illustrative example, to be sufficient for authentication, an authentication object 500 may be required to contain an attestation that an accelerometer of a computing device measured a certain amount of activity within a specified time period, such as the previous six hours measured from a point of time in a process involved for generation of the authentication object 500 or since a particular time reference (e.g., 7:00 AM PST). Such an attestation may be useful, for example, as discussed in more detail below for children to prove, using authentication objects, to parents or other authorities that they have engaged in a particular amount of physical activity prior to engaging in another activity considered sedentary, such as watching television, playing electronic games or otherwise interacting with a system (e.g., set top box, media player and/or gaming console) that may utilize authentication objects as an access control mechanism.

Other data included in the sensor data attestation may be an attestation that a computing device is within a certain geo-fenced area as determined by a global positioning service sensor of the computing device. As an example, a system that processes an authentication object may verify attested global positioning service (GPS) data to verify that the authentication object was submitted from a device that is within specified distance of a reference location, which may be a static reference location or which may be determined by, for instance, a GPS sensor of another device. The location may, of course, be determined in other manners. For example, the computing device may receive coarse-grained location data using a location service. Both Wi-Fi hotspots and cell towers can be used to approximate a location of the computing device. When the location service is polled, the IDs of the Wi-Fi hotspots and cell towers in the area are sent to the location service, which includes a database storing location information on Wi-Fi hotspots and cell towers. The location service returns an approximate location (e.g., latitude and longitude) of the computing device based on the MAC address of the Wi-Fi hotspot. It should be noted that the accuracy of the location data may be between 100 m-500 m using Wi-Fi hotspots and greater than 500 m using cell towers. In contrast, the accuracy of GPS location data may be between 2 m-20 m. Generally, any sensor included in the device may be used and sensor data attestation 512 may include information based, at least in part, on measurements from any of the sensors.

The manner in which attestations are provided in an authentication object may vary in accordance with various embodiments. For example, in some embodiments, attestations comprise expressions indicting that particular conditions are true, such as that a sensor has measured a certain amount of activity or that a GPS data indicates a location within an area defined as suitable. Attestations with such expressions may lack the actual measurements. In other embodiments, an attestation may include data that is measured for the attestation which is then processed by a system that processes the authentication object. In this manner, the attestation is an attestation that data is accurate and whether the data satisfies conditions required for authentication or otherwise is determined by another system to which the authentication object 500 is submitted. Computing environment attestations may be used in connection with sensor attestations to enable verification that, for instance, executable code of an application (e.g., authentication object manager or other application) correctly and accurately calculates that the conditions are true and/or correctly and accurately provides sensor data. In other words, computing environment attestations may be used to prove that executable code that causes a computer system to provide sensor data, provide conclusions determined based at least in part on sensor data and/or provide other information is unmodified and, therefore, can be trusted.

It should be noted that the authentication object 500 may include some (but not all) or all types of data illustrated in FIG. 5. In addition, an authentication object may include additional data not discussed here in and/or not illustrated in FIG. 5. Generally, the types of data included in an authentication object may vary widely in accordance with various embodiments and with the various systems that may utilize authentication objects for authentication. Further, while FIG. 5 and the accompanying description use various types of information included in an authentication object for the purpose of illustration, in various embodiments, an authentication object may lack some or all of the example information but rather contain a verifiable (e.g., cryptographically verifiable) attestation that various conditions regarding an identity and/or a computing environment are satisfied. Such an attestation may, for example, include a digital signature of executable code of one or more applications configured to verify the conditions. Other variations are also considered as being within the scope of the present disclosure. The applications may be executed on a device of the user on behalf of which the authentication object is presented or another device.

In some embodiments, authentication objects may encode one or more policies. A policy encoded in an authentication object may specify one or more limitations on use of the authentication object and/or one or more permitted uses of the authentication object. Policies encoded in authentication objects may be used, for example, in embodiments where authentication objects are used to delegate access rights to others, such as described in more detail below. Further, one or more policies may be transmitted (e.g., by a system requiring authentication) to an authentication object manager. The authentication object manager may determine whether an authenticating device complies with the policy and, if applicable, include in authentication object a cryptographically verifiable or other attestation that the device complies with the policy. An attestation to the executable code of the authentication object manager and/or a digital signature of the policy may also be included to ensure that the attestation regarding compliance with policy is accurate. Policies used in such embodiments may specify conditions on one or more security features, such as certain security features being enabled. Example security features include the ability to perform remote data destruction, data destruction after a number of incorrect passcode entry attempts, and/or others.

As illustrated by the lock symbol in FIG. 5, in an embodiment, an authentication object 500 is generated in a secure manner. For example, in an embodiment, an authentication object 500 is generated to be cryptographically verifiable, such as described above. For example, the authentication object 500 or a portion thereof may be encrypted so as to be decryptable by a system to which the authentication object 500 is presented. For example, in an embodiment the authentication object 500 or a portion thereof is encrypted using a public key of a public/private key pair where the private key of the public/private key pair is securely maintained by a system that analyzes the authentication object 500 for verification. The authentication object may be encrypted by the public key itself or in other ways utilizing the public key. For example, a symmetric cryptographic key may be generated and used to encrypt the authentication object 500 and the public key may be used to encrypt the symmetric key. The encrypted symmetric key may be provided as part of the authentication object 500 so that a system that processes the authentication object 500 for the purpose of making authentication decisions may use its copy of the private key corresponding to the public key to decrypt the symmetric key and then use the symmetric key to decrypt the authentication object. Other variations, including encryption of the authentication object 500 using a symmetric cryptographic key maintained as a secret shared between the system that encrypted the authentication object 500 and a system to which the authentication object is presented for verification are also considered as being within the scope of the present disclosure. Further, various embodiments may utilize different layers of encryption and the verification of an authentication object may be performed by a distributed system having multiple components, each of which is able to access some, but not necessarily all, information in the authentication object through decryption.

As discussed above, the authentication object 500 may be cryptographically verifiable in other ways, such as with the use of digital signatures. Some or all of the authentication object 500 may be digitally signed using a key such that a digital signature of the authentication object 500 is verifiable by a system that processes the authentication object for making authentication decisions. In one example, some or all of the authentication object 500 may be digitally signed using a private key of a public/private key pair. A certificate corresponding to the private key may be provided as part of, or otherwise with, the authentication object 500 so that a system processing the authentication object 500, for the purpose of making authentication decisions, may utilize a public key corresponding to the private key and may communicate with a certificate authority to verify the authenticity of the certificate provided. Other variations, including variations in which symmetric cryptographic keys shared between an authentication object manager or otherwise with a computing device on which the authentication object manager operates and the system that verifies authentication objects may be used to encrypt and/or digitally sign some or all of the authentication object 500.

Other variations include variations where different parts of the authentication object 500 are encrypted and/or digitally signed using different keys than discussed above. As one example, as discussed in more detail below, a cryptographic module, such as a trusted platform module (TPM), may be used to generate an attestation. The attestation may be digitally signed and/or encrypted by the TPM, utilizing a key securely stored within the TPM and inaccessible to the authentication object manager. A certificate usable to verify this signature may be provided with the authentication object 500 in connection with an attestation. Other portions of the authentication object 500 including or excluding the attestation and/or certificate may be digitally signed and/or encrypted using a key accessible to the authentication object manager. Other variations are also considered as being within the scope of the present disclosure.

Further, it should be noted that data obtained for the authentication object may be obtained by a computer system that generates the authentication object at different times. For example, some long-term alphanumeric credentials 504 may be obtained well in advance of generation of the authentication object 500, such as during a provisioning process of a representation of the authentication object 500. During such a process, the user, for example, may input into an authentication object manager the long-term alphanumeric credentials 504. Other information (long-term and/or short-term credentials, e.g.) may be obtained at different times such as in response to an indication that an authentication object corresponding to a selected representation of the authentication object should be used for authentication. As an example, once a representation of an authentication object is selected for authentication, a graphical user interface may prompt for the input of biometric credentials (e.g., a scan of a biometric trait), a PIN, an OTP code or other information. An authentication object may include information obtained at different times.

Other variations include variations where authentication objects are periodically or aperiodically updated by a background process such that an authentication object that is recent enough to be sufficient for use in authentication is available upon selection of a corresponding representation of the authentication object. The background process may, for example, detect that a stored authentication object or stored information for an authentication object has expired and, as a result, may obtain or prompt to obtain fresh information which may then be stored and/or used to generate an authentication object that is stored for future use.

Figure 6:
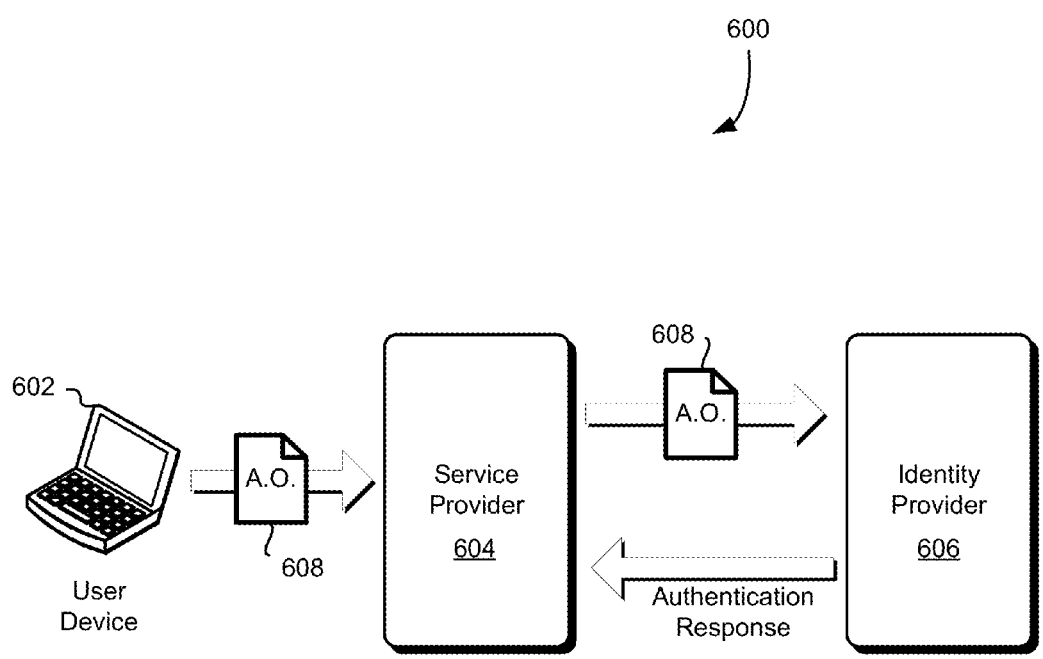
FIG. 6 shows an illustrative example of an environment in which various embodiments may be practiced.

In various examples described herein, users are described as providing authentication objects to service providers for verification thereby. However, numerous variations are considered as being within the scope of the present disclosure. FIG. 6, for example, shows an illustrative example of an environment 600 in which an authentication object is verified not by the service provider for which access is desired by a user, but by another entity. That is, a computer system managed by another entity. In an embodiment, the environment 600 includes a user device 602, a service provider 604 and an identity provider 606. The user device 602 is illustrated in FIG. 6 as a notebook computer, although the user device may be any device such as described elsewhere herein. The service provider 604 may comprise a collection of computing devices, collectively configured to provide a service to one or more users through corresponding devices used by the users. The service provider 604 may, for instance, provide a website or a backend system supporting a mobile or other application executing on the user device. The identity provider 606 may be a computer system comprising a collection of computing devices collectively configured to manage authentication for a set of service providers including the service provider 604. The identity provider 606 may, for example, be an entity that operates its own services such as social networking services, an electronic commerce website, its own other type of website and/or other services.

In an embodiment as illustrated in FIG. 6, the user device 602 provides an authentication object 608 to the service provider 604 for the purpose of authenticating with the service provider 604 and gaining access to services for which authentication is required. The authentication object 608 may be provided, for example, as a result of user input provided to the user device 602 by a user of the user device 602. The user may, for example, utilize a graphical user interface or other interface such as described above to select the authentication object. Instead of verifying the authentication object 608 itself, the service provider 604 may transmit the authentication object 608 or information derived therefrom to the identity provider 606. The identity provider 606 may process the authentication object 608, such as by cryptographically verifying the authentication object 608 and determining whether credentials and/or other information provided in the authentication object 608 are valid or otherwise satisfy one or more conditions for authentication.

The identity provider 606 may make an authentication decision determined based at least in part on the authentication object 608 and generate an authentication response which, in an embodiment, is a communication or collection of communications that indicate whether authentication was successful (e.g., whether the information contained within the authentication object was sufficient for authentication). The generated authentication response may then be provided from the identity provider 606 to the service provider 604. If the authentication response from the identity provider 606 indicates that authentication was successful, the service provider 604 may allow the user device 602 to access services (e.g., website functionality) for which authentication was required.

Similarly, if the authentication response indicates that authentication was not successful, or if the service provider 604 does not receive an authentication response, the service provider 604 may continue to restrict access to services for which authentication is required, although access to other services such as browsing portions of a website may remain to be permitted.

In this manner, a user of the user device 602 is able to utilize authentication objects despite a service provider 604 not being able to process the particular authentication objects being used. Similarly, the service provider 604 may utilize the services of another provider to manage authentication to avoid having to manage authentication itself, or to expand the number of users that are able to access the service provider's site by enabling users to utilize authentication services of another provider.

As with all embodiments described herein, variations are considered as being within the scope of the present disclosure. For example, in FIG. 6 a flow of information is illustrated, where an authentication object is transmitted to the service provider 604 from the user device 602, and where the service provider 604 passes the authentication object 608 to the identity provider 606 for verification. Variations include embodiments where the user device 602 provides the authentication object 608 directly to the identity provider 606, instead of through the service provider 604. For example, a portion of a web-page provided by the service provider 604 may be configured such that a request to authenticate is transmitted by the user device 602 to a network address of the identity provider 606, instead of a network address of the service provider 604. A portion of the web-page may, for example, use framing techniques to frame a portion of content linked to the network address of the identity provider 606.

The identity provider 606 may, upon successful verification of the authentication object, provide cryptographically verifiable proof of successful authentication to the user device for use in proving successful authentication with the service provider 604. For example, the proof may be encrypted using a public key of a public/private key pair for which the service provider 604 has access to the private key. As another example, the proof may be digitally signed by the identity provider 606 using a private key of the identity provider such that the service provider 604 can verify the digital signature using a corresponding public key. The user device 602 may provide the proof of authentication received from the identity provider 606 to the service provider 604 in connection with requests submitted to the service provider 604. The service provider 604 can cryptographically verify the proof and determine whether to provide access.

Figure 7:
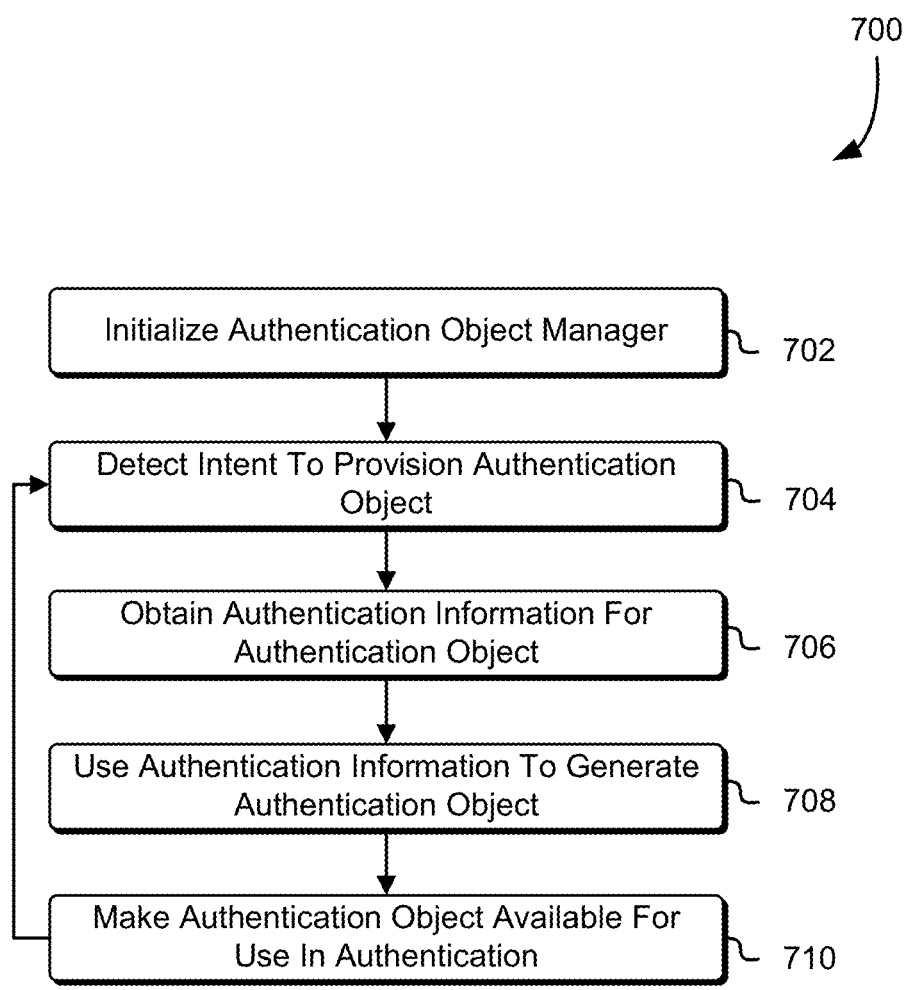
FIG. 7 shows an illustrative example of a process for making an authentication object available for use in authentication in accordance with at least one embodiment.

As noted above, an authentication object manager may be configured to provide access to authentication objects (i.e., the ability to cause submission of authentication objects on behalf of a user). FIG. 7 shows an illustrative example of a process 700, which may be used to set up an authentication object manager in accordance with various embodiments. The process may be performed by any suitable system, such as by a user device described above, or generally, any device that implements an authentication object manager. In an embodiment, the process 700 includes initializing 702 an authentication object manager. Initializing the authentication object manager may be performed in various ways, in accordance with various embodiments. For example, initialization of the authentication object manager may include downloading executable code for the authentication object manager from a network resource, such as from a website or an application store. Initialization may also include installing the authentication object manager on a device, performing the process 700. The authentication object manager may be initialized in other ways. For example, a device may be purchased or otherwise obtained with executable code for the authentication object manager, and initialization of the authentication object manager may include instructing the device to execute the executable code of the authentication object manager for the first time. And generally, in some embodiments, initializing the authentication object manager may include simply launching an instance of the authentication object manager by instructing a computing device to execute executable code of the authentication object manager in any way by which a user interface allows for such launching.

Once the authentication object manager has been initialized 702, the process 700 may include detecting 704 an intent to provision an authentication object. Provisioning the authentication object may be performed in various ways in accordance with various embodiments. Generally, provisioning an authentication object may be performed by providing information to the authentication object manager for use in generating the authentication object.

In some embodiments, provisioning the authentication object includes providing the authentication object manager sufficient information to generate and store the authentication object for future use. In some embodiments, provisioning the authentication object includes providing the authentication object manager some but not all information sufficient for generation of the authentication object, where the remainder of information is to be obtained at a later time, such as upon detection of an intent to use the authentication object. Generally, provisioning an authentication object includes interacting with the authentication object manager to cause the authentication object manager to make a representation of the authentication object available for selection to cause use of the corresponding authentication object, whether the authentication object is pre-generated and stored or generated at a later time.

Detecting the intent to provision the authentication object may be performed in various ways in accordance with various embodiments. For example, a user interface of the authentication object manager may provide an option for a user to select a command to provision a new authentication object. The option may, for example, be presented to the user in the form of a button or selectable item in a menu. As another example, a voice command to provision an authentication object may be used in some embodiments. Generally, any way by which interaction with an interface of a computing device performing the process 700 may be used to cause the computing device to detect the intent to provision the authentication object.

Upon detecting 704 the intent to provision an authentication object, the process 700 may include obtaining 706 authentication information for the authentication object. The authentication information may include, for example, one or more types of information described above in connection with FIG. 5, such as a username and password for a system for which the authentication object is to be used. Other authentication information may also include information that enables the authentication object manager to properly format the information, such as by identifying a domain name or other identifier of a system for which the authentication object is to be used. Other information may also be obtained, such as an identifier (e.g., alphanumeric, non-alphanumeric but graphical or otherwise) for a representation of the authentication object to enable a user to distinguish the representation from other representations of authentication objects.

Once the authentication information has been obtained 706, the authentication information may be used 708 to generate an authentication object. The generated authentication object may be stored and made 710 available for use in authentication, making the authentication object available may include configuring a user interface of the authentication object manager to provide a graphical and/or other representation of the authentication object to enable user selection of the authentication object by selection of the corresponding representation.

Numerous variations of the process 700 are considered as being within the scope of the present disclosure. For example, as noted above, authentication objects may be generated at different times in accordance with various embodiments. In the example described above, an authentication object is provisioned and stored to be used at a later time for authentication object upon user selection of the authentication object. As noted, however, some embodiments may include generating an authentication object at a later time, such as responsive to selection of a representation of the authentication object and an indication that the authentication object is to be used for authentication. Accordingly, upon detecting 704 the intent to provision an authentication object, some, but not all authentication information required for the authentication object may be obtained and stored at a later time when the authentication object is to be generated. Additional information may be later obtained, such as upon detection of an intent to use the authentication object for use in authentication, and used to generate the authentication object.

In some embodiments, the authentication object is simply generated at a later time, despite all information required for the authentication object already being available and stored. As another example of a variation considered as being within the scope of the present disclosure, detection of an intent to provision an authentication object may be performed in numerous ways, including pursuant to user input indicative of an intent to provision the authentication object. Such intent may be implied from other contexts. For example, in some embodiments, a browser, plug-in or other application may monitor use of the browser application. When a user inputs authentication information, such as username and password, into a field of a web page, the authentication object manager application monitoring use of the browser may prompt the user with a request whether the user desires to provision an authentication object using the information provided into the web page.

In some embodiments, the provisioning of an authentication object causes another system to perform one or more reconfiguration actions to be taken by another system. For instance, when an authentication object is provisioned using an authentication object manager, one or more communications (e.g., notifications), which may be cryptographically authenticated, may be transmitted to a service provider system to cause the service provider system to allow authentication objects generated in accordance with the various techniques described herein to be used for authentication. The other system may, for instance, update a database of authentication information such that, when a valid authentication object is used for authentication, the authentication succeeds whereas the authentication would not have succeeded absent the one or more communications. Such communications may, for instance, be utilized in embodiments where authentication claims submitted as a result of selection of a representation of an authentication object are different than authentication claims submitted through other techniques, such as conventional techniques used for authentication. Further, such notifications that cause reconfiguration may also be used in embodiments where authentication objects are used in connection with delegation of access from one user to another, as described in more detail below.

Figure 8:
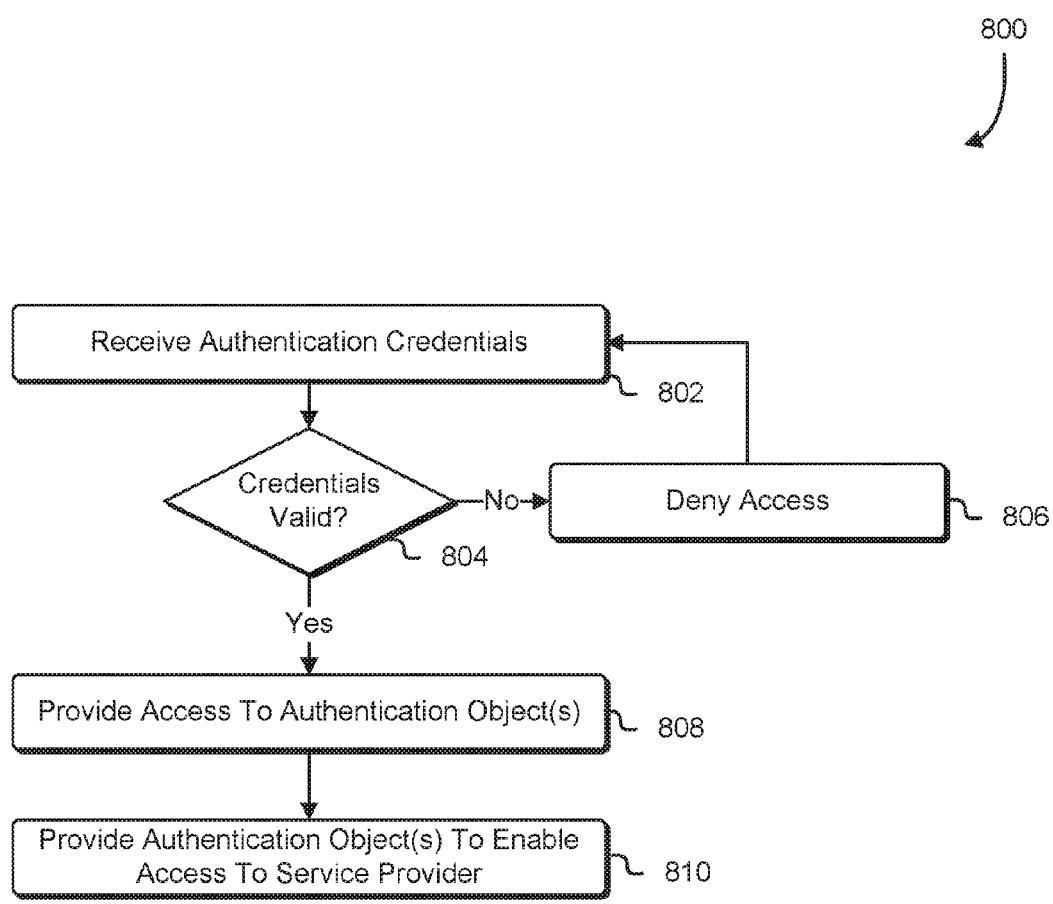
FIG. 8 shows an illustrative example of a process for providing authentication objects in accordance with at least one embodiment.

As noted above, an authentication object manager may provide an enhanced user experience and ease of use of authentication objects. However, in order to maintain security, authentication must be proven to an authentication object manager in accordance with some embodiments. In this manner, a user will not be able to access authentication objects without first having authenticated sufficiently to an authentication object manager. FIG. 8, accordingly, shows an illustrative example of a process 800 which may be used to control access to authentication objects. The process 800 may be performed by any suitable system, such as by a user device such as described above, or any system that implements an authentication object manager. In an embodiment, the process 800 includes receiving 802 authentication credentials sufficient for an authentication object manager. The authentication credentials may, for example, comprise a username and password and/or other information sufficient for authentication. While "credentials" is used in the plural for the purpose of illustration, a single piece of information may be sufficient in some embodiments. Further, the authentication credentials may be received in the form of an authentication object/authentication claim. In some embodiments, an authentication object manager is configured to provide an interface for input of the authentication credentials, such as by providing a field for a username and a field for a password. In other embodiments, the system performing the process 800 may receive the authentication credentials by way of a claim received through an application different than the authentication object manager. For example, in some embodiments, the authentication claim is received through an authentication screen of an operating system where the authentication screen is used to log in to an account of the operating system. Other variations, including where an authentication claim is verified by a remote system to provide access to a local authentication object manager, are also considered as being within the scope of the present disclosure.

Upon receipt of the authentication claim, the process 800 may include determining 804 whether the authentication credentials are valid. Determining 804 whether the authentication credentials is valid may comprise, for example, determining whether the credentials provided match credentials that have been stored. Determining whether there is a match may be performed in any suitable way, such as by comparing the credentials to stored credentials or comparing information derived from the credentials, such as a hash value with reference information, such as a stored hash value. Generally, any way by which credentials may be verified are considered as being within the scope of the present disclosure. If determined 804 that the credentials are invalid, access to the authentication object and generally, to the authentication object manager may be denied 806. Access to other functionality may also be denied as well. Such as access to other applications executing on the same system that performs the process 800.

If, however, it is determined 804 that the authentication credentials are valid, the process 800 may include providing 808 access to one or more authentication objects that have been provisioned for the authentication object manager, such as described above. As noted above, providing access may include providing, through a user interface, an ability for a user to select representations of the authentication objects that have been provisioned and indicate that a selected representation is to be used for authentication.

Accordingly, one's access is provided and once an authentication object has been selected, the process 800 may include providing one or more security objects to enable access to one or more security providers. Providing 810 the one or more security objects may be performed in any suitable manner. For example, if the service provider's system verifies authentication objects in a different system, the process 800 may include transmitting the authentication object over a network to the system that verifies the authentication objects. In some embodiments, the system that verifies an authentication object may be a local programming module on the system that performs the process 800 and the authentication object may be provided to that system accordingly.

Figure 9:
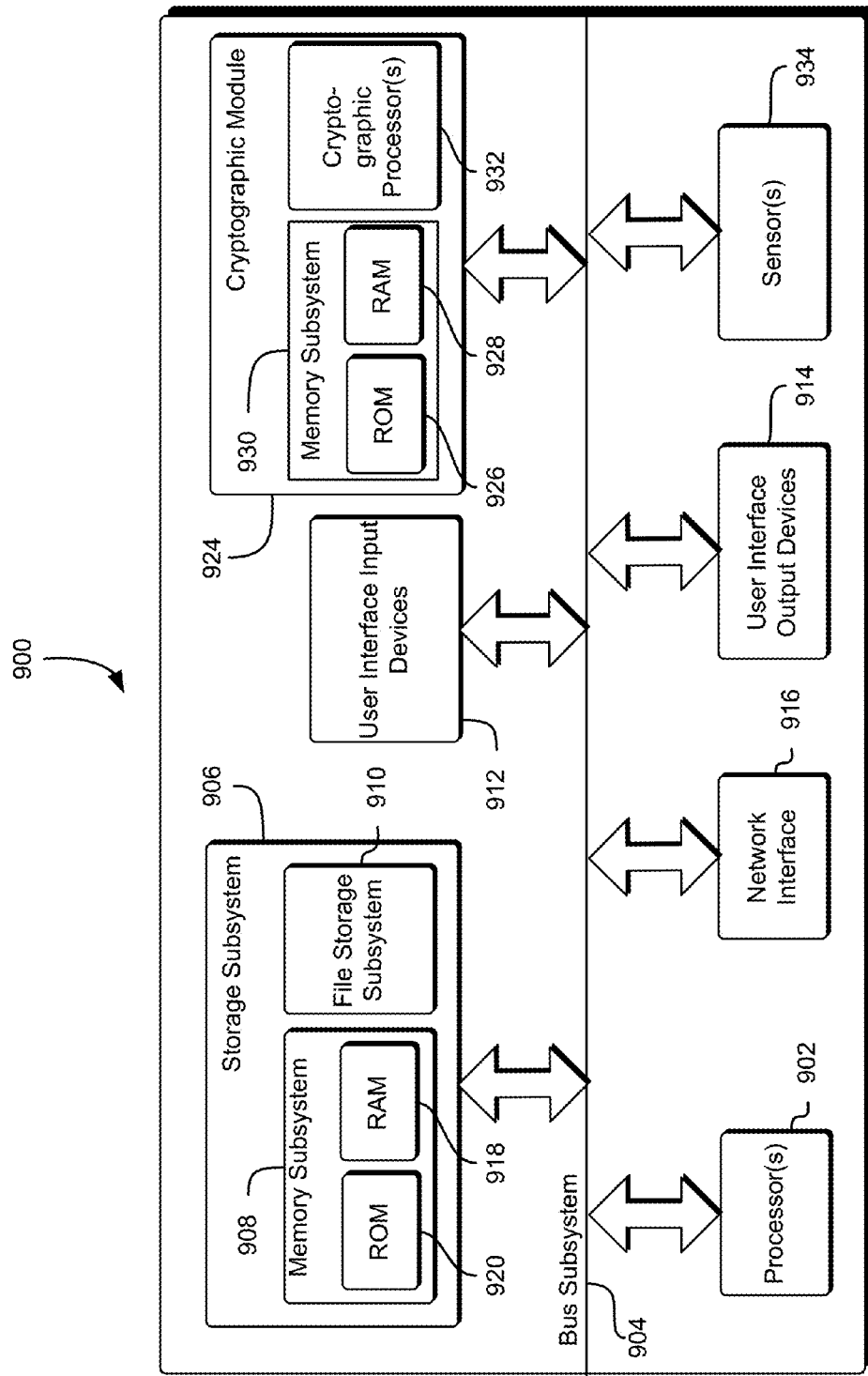
FIG. 9 shows an illustrative example of components of a computing device in accordance with at least one embodiment.

FIG. 9 is an illustrative, simplified block diagram of an example device system 900 that may be used to practice at least one embodiment of the present disclosure. In various embodiments, the device system 900 may be used to implement any of the systems illustrated herein and described above. For example, the device system 900 may be used to implement an authentication object manager and other applications, such as a browser application, in accordance with various embodiments. As shown in FIG. 9, the device 900 may include one or more processors 902 that may be configured to communicate with and are operatively coupled to a number of peripheral subsystems via a bus subsystem 904. These peripheral subsystems may include a storage subsystem 906, comprising a memory subsystem 908 and a file storage subsystem 910, one or more user interface input devices 912, one or more user interface output devices 914, a network interface subsystem 916, a cryptographic module 924, comprising a memory subsystem 930 and one or more cryptographic processors 932. The peripheral subsystems may also include one or more sensors 934 in addition to sensors of input devices 912. Such sensors may include, but are not limited to, GPS sensors, accelerometers, temperature sensors and others.

The bus subsystem 904 may provide a mechanism for enabling the various components and subsystems of device system 900 to communicate with each other as intended.

Although the bus subsystem 904 is shown schematically as a single bus, alternative embodiments of the bus subsystem may utilize multiple busses.

The network interface subsystem 916 may provide an interface to other device systems and networks. The network interface subsystem 916 may serve as an interface for receiving data from and transmitting data to other systems from the device system 900. For example, the network interface subsystem 916 may enable transmission of authentication objects and other information, such as electronic requests to access a system (e.g., receive a webpage) and may enable receipt of responses to the requests, such as webpages or other information. The network interface subsystem 916 may also facilitate the receipt and/or transmission of data on other networks, such as an organizations intranet and/or other networks described below.

The user interface input devices 912 may include one or more buttons, a keyboard, keypad, pointing devices, such as an integrated mouse, trackball, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Further, in some embodiments, input devices may include devices usable to obtain information from other devices, such as long-term or short-term credentials for use in generating an authentication object, as described above. Input devices may include, for instance, magnetic or other card readers, one or more USB interfaces, near field communications (NFC) devices/interfaces and other devices/interfaces usable to obtain data (e.g., long-term or short-term credentials) from other devices. In general, use of the term "input device" is intended to include all possible types of devices and mechanisms for inputting information to the device system 900.

User interface output devices 914, if any, may include a display subsystem, a printer or non-visual displays, such as audio and/or tactile output devices, etc. Generally, the output devices 914 may invoke one or more of any of the five senses of a user. The display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the device system 900. The output device(s) 914 may be used, for example, to present user interfaces to facilitate user interaction with applications performing processes described herein and variations therein, when such interaction may be appropriate. While a device 900 with user interface output devices is used for the purpose of illustration, it should be noted that the device 900 may operate without an output device, such as when the device 900 is operated in a server rack and, during typical operation, an output device is not needed.

The storage subsystem 906 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, may be stored in the storage subsystem 906. These application modules or instructions may be executed by the one or more processors 902. The storage subsystem 906 may additionally provide a repository for storing data used in accordance with the present disclosure. The storage subsystem 906 may comprise a memory subsystem 908 and a file/disk storage subsystem 910.

The cryptographic module 924, which may be a trusted platform module (TPM), includes a memory subsystem 930, including a main random access memory (RAM) 928 for storage of instructions and data during program execution and a read only memory (ROM) 926, in which fixed cryptographic information may be stored, such as a hardware secret stored securely within the device 900 so as to be non-exportable (i.e., inaccessible through any call to the cryptographic module 924). The cryptographic module 924, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 900 may also store cryptographic keys in RAM 928 and/or processor registers for temporary cryptographic processing. The cryptographic information stored in memory may be used in combination with cryptographic information obtained via the network interface 916 and/or one or more of the user interface input devices 912. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 924 may be configured to collectively perform various operations used generating cryptographically verifiable information for authentication objects.

As noted above, in various embodiments of the present disclosure, hardware secrets are securely stored within the cryptographic module 924. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 10:
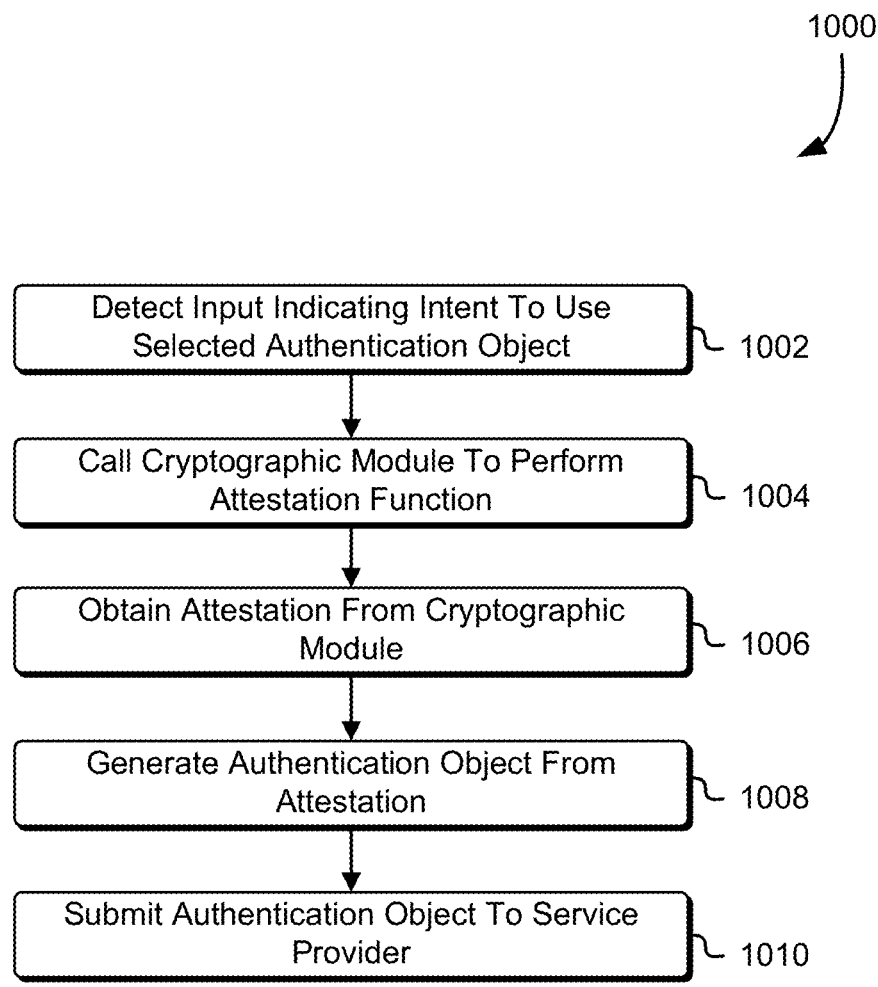
FIG. 10 shows an illustrative example of a process for providing an authentication object in accordance with at least one embodiment.

As discussed above, various embodiments of the present disclosure include the use of various attestations to be included in authentication objects where the attestations are sufficient and/or necessary for authentication with a system. FIG. 10, accordingly, shows an illustrative example of a process 1000 for providing an authentication object which includes an attestation in accordance with various embodiments. The process 1000 may be performed by any suitable system, such as a user device such as described above or generally any system that implements an authentication object manager. In an embodiment, the process 1000 includes detecting 1002 user input indicating an intent to use a selected authentication object. A user interface of an authentication object manager, for example, may have been used by a user to select a representation of the authentication object. Such input or additional input may correspond to an indication that the selected authentication object is to be used.

In an embodiment, the process 1000 includes calling 1004 a cryptographic module to perform an attestation function. The cryptographic module, for example, may be a trusted platform module (TPM) of a computing device performing some or all of the process 1000. The call to the cryptographic module may be formatted to cause the cryptographic module to generate a cryptographically verifiable attestation required for an authentication object to be generated. For example, the call may specify, or otherwise indicate, the executable code to be signed by the cryptographic module. The attestation may be generated based at least in part on executable code for firmware, an operating system, and/or one or more applications, including the authentication object manager. The attestation may also be based at least in part on sensor data, such as GPS sensor data, accelerometer sensor data and/or other sensor data and/or information derived therefrom, such as statistical information generated based at least in part on a statistical analysis of the sensor data. The attestation may comprise output of a cryptographic function (e.g., cryptographic hash function) applied to executable code and/or non-executable information stored by the computing device performing the process 100. The attestation may be generated using a private key of the cryptographic module and may include a certificate for the public key corresponding to the private key, where the certificate is cryptographically verifiable using a certificate authority.

Once the cryptographic module has generated an attestation, the process 1000 may include obtaining the attestation from the cryptographic module. The attestation may be performed in any suitable way and may include any other information, such as a certificate to be presented with the attestation for use in connection with a certificate or authority to verify the attestation by a system that verifies the authentication object to be presented. Once the attestation has been obtained, the process 1000 may include generating 1008, an authentication object based at least in part on the attestation. As noted above, the authentication object may be generated using additional information in addition to the attestation. Such information may, for example, include information discussed above in connection with FIG. 5. As one illustrative example, the authentication object may include a username and password and/or information derived from a username and/or password. Once the authentication object has been generated 1008, the authentication object may be submitted 1010 to a service provider, such as described above. In this manner, the service provider may verify, or otherwise cause to be verified, the authentication object in order to determine whether to provide access for which an authentication is required. The submission of the authentication object may be performed in any suitable way. For example, the authentication object may be included with a request submitted to the service provider, where the request may be a request for access or a request to authenticate.

In some embodiments, provisioning an authentication object includes a negotiation (i.e., series of communications) with a remote system for which an authentication object is to be used to securely notify the remote system that an authentication object manager may use its own credentials on behalf of a user. Such a negotiation may include providing the remote system information sufficient for the remote system to make authentication decisions based at least in part on authentication objects that utilize credentials of an authentication object manager that submits authentication objects on behalf of a user. Such information may include, for example, information usable to cryptographically verify information from the authentication object manager as well as cryptographically verify (e.g., via user credentials) that the authentication object manager is authorized to authenticate on behalf of the user using its own credentials.

Figure 11:
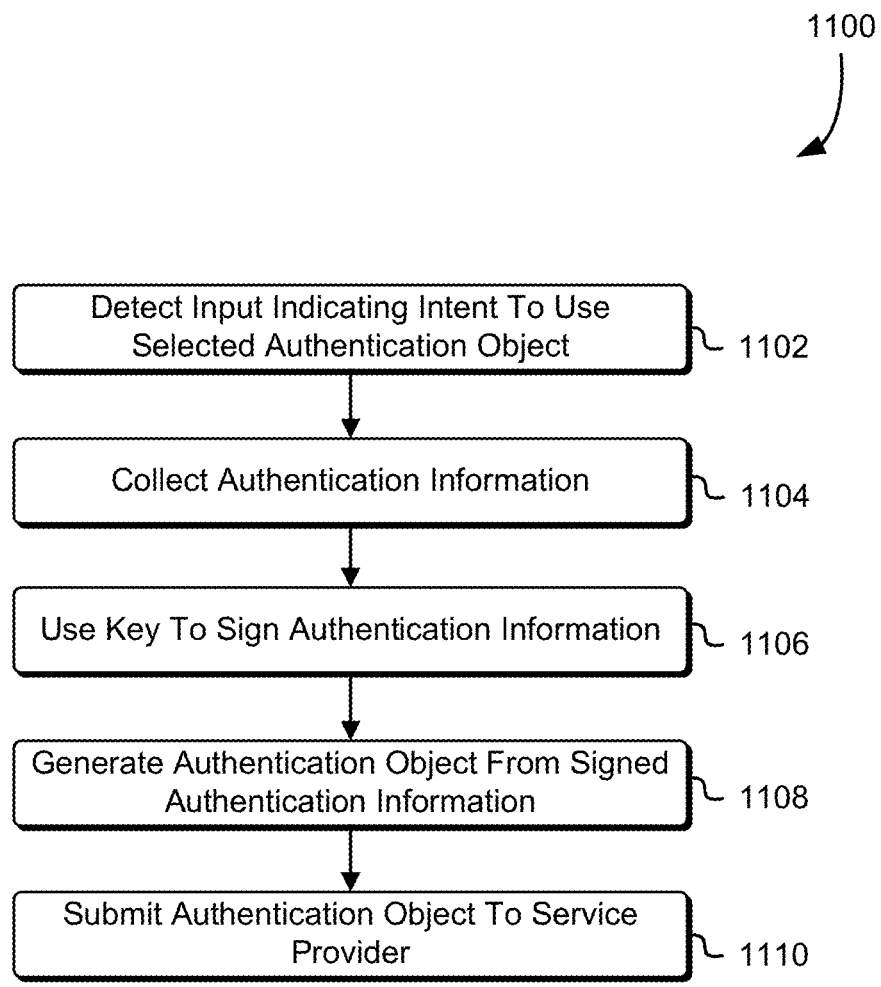
FIG. 11 shows an illustrative example of a process for providing an authentication object in accordance with at least one embodiment.

FIG. 11, accordingly, shows an illustrative example of a process 1100, which utilizes credentials of an authentication object manager to obtain access to one or more services. The process 1100 may be performed by any suitable system, such as by a computing device that implements an authentication object manager. In an embodiment, the process 1100 includes detecting 1102 user input indicating an intent to use a selected authentication object. The user input may be detected 1102 such as described above, for example, by detecting user input indicating selection of a representation of the authentication object. Upon detecting 1102 the user input, indicating an intent to use the selected authentication object, the process 1100 may include collecting authentication information. The authentication information collected may include, for example, information discussed above in connection with FIG. 5. Alternatively, or in addition, the authentication information may include an identifier of the selected authentication object, which may be a unique identifier for the authentication object. Generally, the authentication information may be any information sufficient, along with credentials of the authentication object manager, to enable an authentication decision by a system to which the authentication object is to be provided.

Upon collection 1104 of the authentication information, a cryptographic key may be used 1106 to digitally sign the authentication information. The key may, for example, be a symmetric key shared as a secret with a system that is to verify the authentication object, or may be a private key of a public/private key pair. Upon signing 1106 the authentication information, an authentication object may be generated 1108 from the sign authentication information, such as described above. The authentication object may comprise, for example, a certificate indicating a public key, usable to verify a digital signature of the authentication information and verifiable by an appropriate certificate authority.

The authentication object may then be submitted 1110 to a service provider to enable the service provider to verify the digital signature of the authentication information, perform any other required analysis of the authentication object and authentication information and make a determination whether to provide access, based in part, on whether the service provider determines that the authentication object is valid for the access requested. In embodiments, where the authentication object encodes an identifier of the selected authentication object, the system verifying the authentication object may, for instance, cryptographically verify the authentication object and, assuming successful verification, provide access in accordance with privileges associated with the identifier.

Figure 12:
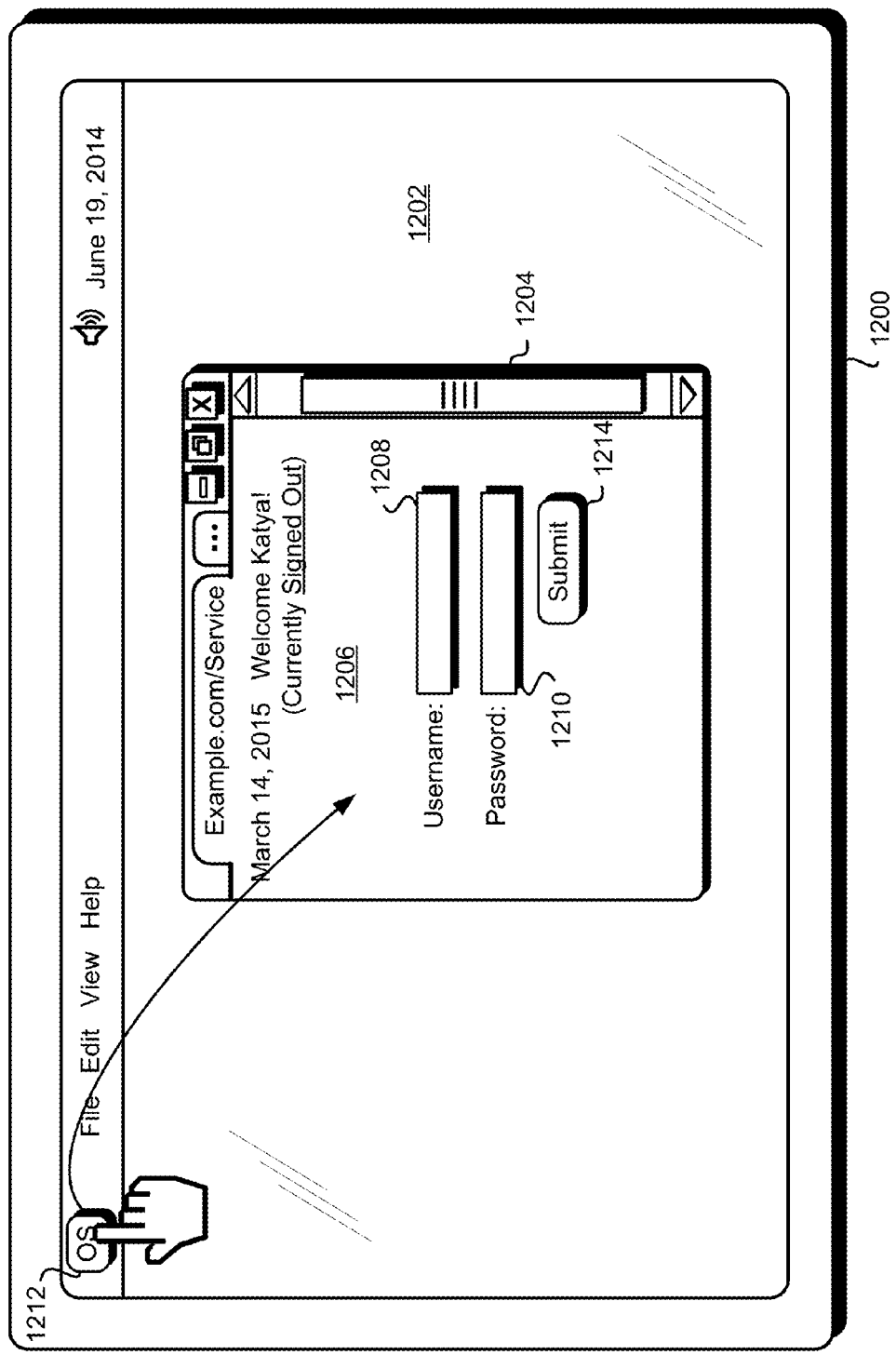
FIG. 12 shows an illustrative example of a display device in accordance with at least one embodiment.

As discussed, various embodiments of the present disclosure provide for increased security while simultaneously providing better usability. FIG. 12 accordingly shows an illustrative example of a variation of the techniques described herein in accordance with various embodiments. In particular, FIG. 12 shows a display device 1200, which displays a user interface 1202. The display device may be, for example, a computer monitor of a notebook or personal computer, a display of a mobile device, a display of a tablet computing device or otherwise a display of a computing device. In an embodiment, the user interface 1202 is provided by an operating system of a computing device causing the user interface 1202 to be displayed. In the particular example illustrated in FIG. 12, a display of a browser application 1204 is displayed on the user interface 1202. The browser application 1204 may be, for example, as described above.

In this particular example, the browser application provides a login screen 1206 from a web page for display. The login screen 1206 may be presented, for example, to enable a user to provide credentials to gain access to one or more services of a service provider that provides the web page 1206 as part of a website. In some embodiments, the user may type a username and password into respective username and password fields 1208, 1210 as with many conventional authentication techniques. However, to improve usability an authentication object manager may be executing as a background process on the operating system. In other words, an authentication object manager application may be executing as a background process with little or no display indicative of the authentication object manager process. Instead of typing or otherwise inputting credentials into the username and password fields 1208, 1210, in an embodiment, the user may select an authentication object such as described above. In this example, the user may select an authentication object by selecting a representation of the authentication object which, in this example, is a displayed logo for the operating system 1202. The logo may, for example, be persistently displayed on the operating system 1202, unless covered by the display of an application executing on the operating system 1202 if such covering is possible.

In some embodiments, for example, the user may perform a drag and drop operation of the logo 1212 onto the web page 1206 or a designated area thereof, such as an area surrounding the username and password fields 1208, 1210 and/or the username and password fields 1208, 1210 themselves. As a result of dragging the logo 1212 to the web page 1206, or another area designated for authentication using authentication objects, one or more operations may occur. In some embodiments, the username and password fields are populated to enable a user to select a submit button 1214 to submit the credentials to a system for verification. In other embodiments, the effect of dragging the logo 1212 into the web page 1206, or other area designated for authentication may cause an authentication object corresponding to the logo 1212 to be submitted without the user having to select the submit button 1214, or otherwise indicating (e.g. by pressing an enter key) a submission for authentication. For example, the authentication object manager process may submit the authentication object itself or may call a function of the browser application 1204 to cause the browser application 1204 to submit the authentication object corresponding to the logo 1212.

Figure 13:
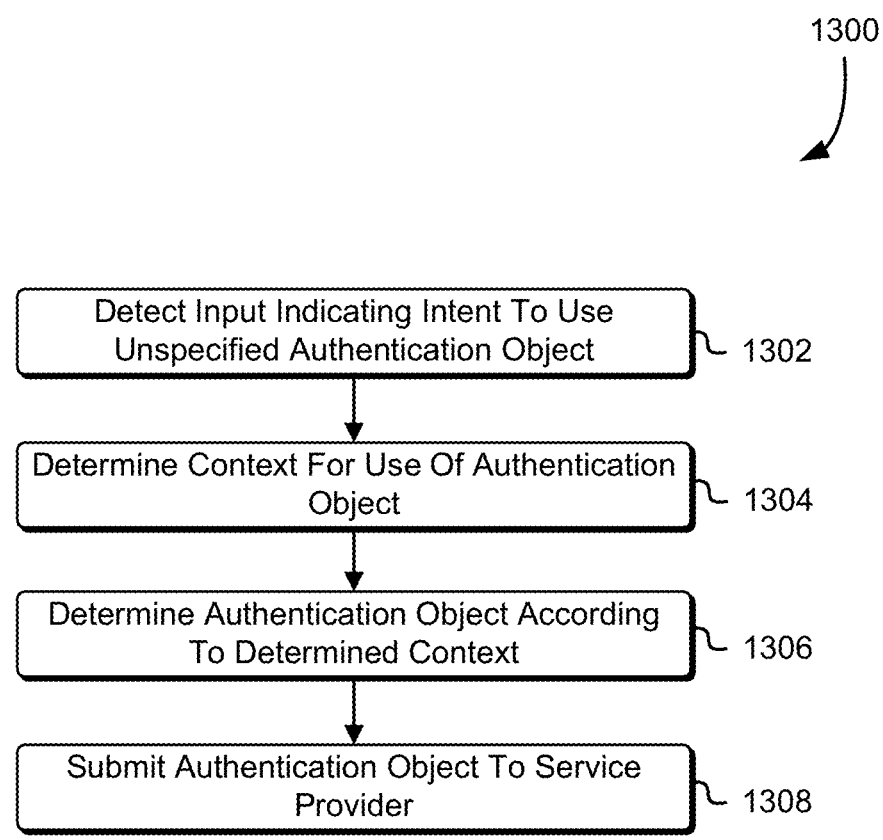
FIG. 13 shows an illustrative example of a process for providing an authentication object in accordance with at least one embodiment.

As noted above, various embodiments of the present disclosure allow for use of multiple authentication objects in various contexts such as for use with different systems, each requiring different authentication objects because, for instance, of a requirement of different credentials. FIG. 13 shows an illustrative example of a process 1300 for submitting an authentication object for use in obtaining access in accordance with various embodiments. The process 1300 may be performed by any suitable system such as by a computing device implementing an authentication object manager application such as described above. In an embodiment, the process 1300 includes detecting 1302 user input indicating an intent to use an unspecified authentication object. The user input may be, for example, input that indicates a desire to use an authentication object. The authentication object may be unspecified, for example, because the user input does not select a particular authentication object from multiple authentication objects or otherwise does not specify the particular authentication object to be used. Referring to FIG. 12, for example, a logo of an operating system or other interface element may correspond to multiple different authentication objects and, as a result, selection of the logo and user input in connection therewith is not specific to a single authentication object.

In an embodiment, upon detection 1302 of the user input indicating an intent to use an unspecified authentication object, the process 1300 may include determining 1304 a context for use of the authentication object. The context may comprise information indicating information sufficient for determining an authentication object sufficient for authentication as desired by the user. For example, referring to FIG. 12, the context may comprise information identifying the service provider that provides the webpage 1206 and/or one or more other service providers relevant to the webpage 1206, such as an identity provider. The information may, for example, be a domain name of the webpage 1206 or identifier derived based at least in part on a domain name, such as a uniform resource identifier (URI). The context information may also include information about the user. For example, the context may comprise information identifying a user (e.g., operating system username) logged into an operating system supporting an application operating in accordance with the process 1300, where the operating system may support many accounts, each corresponding to different identifying information. In this manner, an authentication object specific to the logged in user may be determined. Generally, the context may comprise information from which a suitable authentication object may be determined. Once the context has been determined 1304, an authentication object (or, in some embodiments, multiple authentication objects) may be determined in accordance with the determined context. As an illustrative example, if the context indicates a particular service provider and/or a particular user, a pre-generated authentication object usable for authentication with the service provider using that user's account may be selected. As another illustrative example, if the context indicates a particular service provider and/or a particular user, determining 1306 the authentication object according to the determined context may comprise generating an authentication object, such as described above, suitable for use with the particular provider(s). As noted above, the authentication object that is generated may be an aggregate of multiple aggregation objects, each usable for different authentication processes.

Generally, any way by which a suitable authentication object is determinable may be used, and the manner by which the authentication is determined may vary in accordance with the different possible contexts. For example, for some providers determining the authentication object may include selecting a pre-generated authentication object from storage, whereas for other providers determining the authentication object may include generating an authentication object after the user input has been detected 1302. Once the authentication object has been determined 1306, a system performing the process 1300 may submit 1308 the authentication object to a service provider for authentication therewith, such as described above.

Figure 14:
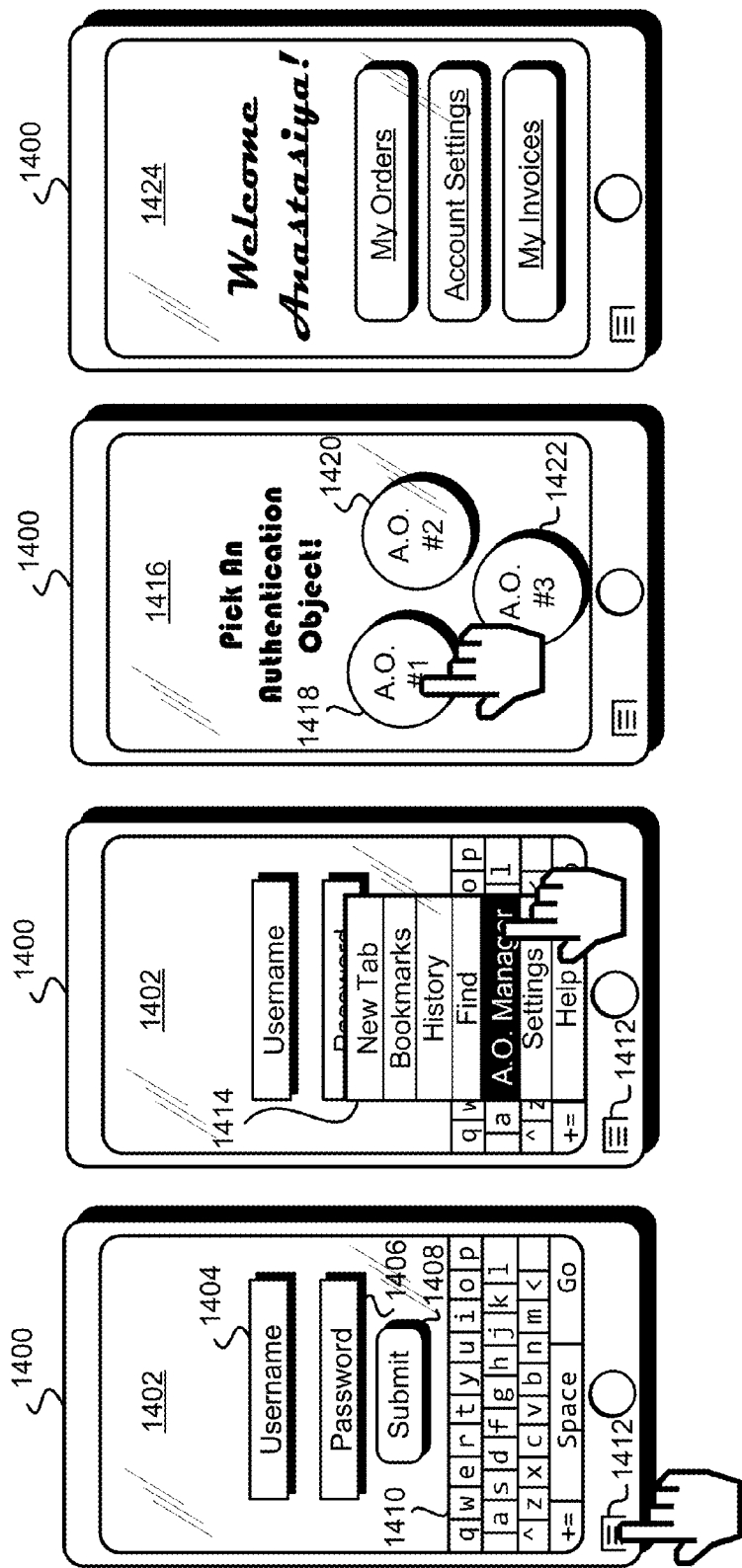
FIG. 14 shows an illustrative example of how a user interface of a mobile device or other device may change in accordance with at least one embodiment.

The techniques by which authentication objects are usable may vary in accordance with the devices on which an authentication object manager operates. FIG. 14, for example, shows an illustrative example of an embodiment enabling use of authentication objects on a mobile device 1400. The mobile device 1400 may be a mobile device operating in accordance with a corresponding operating system such as a version of an Android operating system, a Windows phone operating system or an Apple iOS operating system, although the techniques of the present disclosure are not limited to those operating systems discussed explicitly herein. The mobile device 1400 may be the computing device described above in connection with FIG. 9, or may be a computing device incorporating components of the device described above in connection with FIG. 9. For example, the mobile device may be a smartphone or table computing device, although the techniques described in connection with FIG. 14 are not limited to such devices.

As illustrated in FIG. 14, use of the mobile device 1400 (e.g., use of a browser or other application) may cause a display to prompt for credentials. Accordingly, as illustrated in FIG. 14, one state of the display of the mobile device 1400 may include an authentication screen 1402. The authentication screen 1402 may, for example, include a username field 1404 and a password field 1406 and a submit button 1408 to enable a user to submit credentials input into the username field 1404 and password field 1406 using a keyboard 1410 of the mobile device 1400. However, entry of a username and password on a mobile device may be cumbersome due to, for example, size constraints and other limitations of the mobile device. Accordingly, as illustrated in FIG. 14, a user may utilize an authentication object manager in order to avoid manual entry of credentials.

In an embodiment, a user is able to utilize an authentication object manager by selecting a menu button 1412, which in the illustrative embodiment shown in FIG. 14, is a virtual (i.e. soft) button on the bottom left-hand corner of the mobile device 1400, although other ways of indicating a desire to use an authentication object manager may be used and may vary in accordance with the various interfaces used on mobile devices. For example, a touch-and-hold operation where a user touches the screen of the mobile device 1400 (e.g., in a username or password field) for greater than a predetermined amount of time may be an alternative to pressing of the menu button, should a menu button be available. Generally, any input that the mobile device 1400 that, according to programming of the mobile device 1400, results in a menu screen is considered as being within the scope of the present disclosure.

Upon selection of the menu button 1412, a menu 1414 may appear superimposed on the display, which in this example shows the authentication screen 1402. In other words, the menu 1414 may appear superimposed on the authentication screen 1402. The menu 1414 may include various options selectable by the user, one of which may be selection of an authentication object manager, indicated in the drawing as "A.O. Manager." The ability to select the authentication object manager from menu 1414 may be a result of programmatic integration between the authentication object manager and the application whose menu 1414 is selectable. Upon selection of the authentication manager from the menu 1414, a screen of authentication object manager application may appear. The screen 1416 of the authentication object manager may include one or more representations of available authentication objects usable for authentication in various contexts. In this example, three authentication objects 1418, 1420 and 1422 are displayed, although there may be greater than three or less than three representations displayed or otherwise available for selection. It should be noted that, as with other embodiments described herein, the authentication objects may appear differently than illustrated in the drawings. For example, a representation of an authentication object may include a logo and/or textual identifier of the service provider (or multiple service providers) for which the authentication object is usable.

In this example, a user may select an authentication object by tapping on the display in an area corresponding to a corresponding representation of the authentication object. In this example, a user taps a first authentication object 1418. Other ways of selecting a representation of an authentication object may be used. For example, the display of the mobile device 1400 may have a visual indicator (e.g., graphic) of an object for receiving representations of authentication objects (e.g., a graphic of a coin slot or key hole) and a drag and drop operation into the visual indicator may be used for selection of the representation in some embodiments. Generally, any way by which user input to the mobile device 1400 can indicate selection of a representation of an authentication object is considered as being within the scope of the present disclosure.

As a result of selection of the representation 1418 of the authentication object, the authentication object corresponding to the representation 1418 may be submitted to a system for which the authentication screen 1402 prompted for credentials. The authentication object manager may, for example, cause an application whose display corresponds to the authentication screen 1402 to submit the authentication object to another system for verification. However, as noted above, the authentication object manager may submit the authentication object itself. As a result of the authentication object having been submitted and also being valid, a display of the mobile device 1400 may change to show a display 1424 enabling access for which authentication was required and for which authentication was provided by submission of the authentication object.

As with other illustrative examples shown herein, variations are considered as being within the scope of this present disclosure. For example, as with other interfaces, instead of automatic submission of an authentication object upon selection of a representation, other operations may occur. For example, upon selection of a representation of an authentication object, the authentication screen 1402 may appear with the username field 1404 and password field 1406 populated to enable the user to select the submit button 1408. Selection of the submit button 1408 may cause submission of the authentication object, which may encode the username and/or password and/or information derived from the username and/or password. In some embodiments, the information submitted upon selection of the submit button 1408 may be different depending on whether the user has manually entered credentials or has selected an authentication object. It should be noted that, in some embodiments, the authentication object, whether automatically submitted or submitted as a result of submission of a "submit" or other user interface element may be formatted in various ways in various embodiments. For instance, in some embodiments, the authentication object generated in accordance with various techniques described herein is formatted so that the authentication object, from the perspective of programming logic of a system verifying the authentication object, is indistinguishable from authentication objects submitted in conventional manners (e.g., authentication objects transmitted upon user input of a username and password and an indication to submit the username and password). For instance, an authentication object may be transmitted with the same information and with the same formatting regardless of whether the authentication object was transmitted due to conventional techniques or techniques described herein. Any distinguishable differences in the authentication objects (e.g., information identifying a technique used to cause transmission of the authentication object) may be included so as to not affect the programming logic of a server that verifies authentication objects. In this manner, an authentication object manager and, generally, techniques described herein are usable without modification to servers that verify authentication objects.

In addition, as discussed above, authentication for the authentication object manager may also be required before authentication objects are made available. Accordingly, a screen may require input of credentials to the authentication object manager before enabling selection from representations of authentication objects. Other operations may serve as sufficient authentication for the authentication object manager. For example, entry of a PIN to unlock the mobile device 1400 may be sufficient to enable access to authentication objects through the authentication object manager. Authentication for access to the authentication manager may take place in various ways, which may be user-configurable through one or more settings screens and which may vary in accordance with device capabilities. For example, in some embodiments, a fingerprint scan or image of the user may suffice. In other embodiments, a short-range communication with another device (e.g., card with RFID chip) may enable access to the authentication object manager. In yet other embodiments, manual entry of credentials may be used. Other variations are also considered as being within the scope of the present disclosure.

Figure 15:
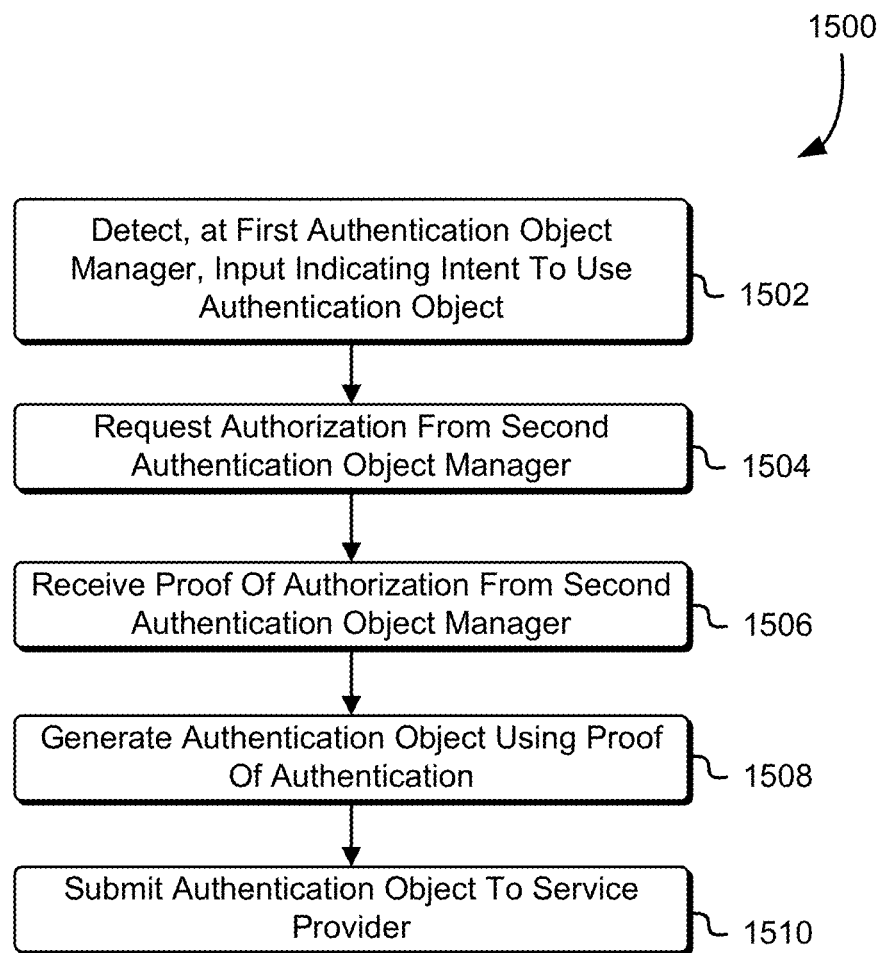
FIG. 15 shows an illustrative example of a process for providing an authentication object in accordance with at least one embodiment.

In various embodiments of the present disclosure, data security may be enhanced through the use of multiple authentication object managers, and generally through the use of multiple applications which may operate on different devices. In an embodiment, for example, authentication objects are required to contain proof of authorization from a quorum of authentication object managers to be sufficient for authentication. A quorum may be defined by one or more quorum rules. In some embodiments, a quorum is defined as a minimum number (e.g., 2) of authentication object managers. In other embodiments, the rules for quorum may be more complex. FIG. 15, which is an illustrative example of a process 1500 which may utilize two authentication object managers being executed on different devices, although the techniques described below in connection with FIG. 15 are extendable to embodiments where authorization from a quorum of authentication object managers where a quorum is more than two are considered as being within the scope of the present disclosure. The process 1500 may be performed by any suitable system such as by a computer system implementing a first authentication object manager of a pair of authentication object managers. In an embodiment, the process 1500 includes detecting at a first authentication object manager, user input indicating an intent to use an authentication object. The user input may be detected 1502 in any suitable manner, such as described above.

Upon detection 1502 of the user input indicating the intent to use the authentication object, the process 1500 may include requesting 1504 authorization from a second authentication object manager. The request may be made in any suitable manner. For example, the first authentication object manager and second authentication object manager may have corresponding network addresses and a network transmission may be transmitted from the first authentication object manager to the second authentication object manager over a network. In some examples, the request may be submitted in accordance with a short-range communication protocol, such as Bluetooth, or in accordance with a protocol implemented over a direct physical connection, such as a cable connecting the device implementing the first authentication object manager and the device implementing the second authentication object manager.

When the second authentication object manager receives the request for authorization and determines to provide authorization, the process 1500 may include receiving 1506 proof of authorization from the second authentication object manager. The authorization may be in the form of information cryptographically verifiable by a system to which an authentication object is to be submitted in accordance with performance of the process 1500. For example, the proof may be digitally signed using a private key of a public/private key pair where the first authentication object manager lacks access to the private key. As another example, the proof may be encrypted using a public key of a public/private key pair where the first authentication object manager lacks access to the private key of the public/private key pair. As yet another example, the proof may be encrypted and/or digitally signed using a symmetric cryptographic key to which the first authentication object manager lacks access but which is managed as a secret shared between the second authentication object manager and a system that verifies authentication objects. The request for authorization from the first authentication object manager and the second authentication object manager may indicate explicitly or implicitly which key to use to render the proof cryptographically verifiable. Other variations are also within the scope of the present disclosure.

Once the proof of authorization has been received 1506, the process 1500 may include generating 1508 an authentication object using the proof of authentication received from the second authentication object manager. The authentication object may, for example, encode the proof of authorization in the authentication object. The authentication object may then be submitted 1510 to a service provider to obtain access to one or more services provided thereby. The system receiving the authentication object may verify (e.g., cryptographically and/or otherwise) that the necessary authorization from the second authentication object manager is received and that any other conditions for authentication are satisfied to make an authentication decision and operate in accordance with the authentication decision.

Numerous variations of the process 1500 are considered as being within the scope of the present disclosure. For example, in some embodiments, the first authentication object manager and the second authentication object manager each generate or otherwise determine authentication objects that are combined in the authentication object that is submitted to the service provider (where the authentication object from the second authentication object manager may be or otherwise contain the proof of authorization). Each of the authentication objects generated respectively by the first authentication object manager and the second authentication object manager may include some or all types of information, such as described above in connection with FIG. 5, and the types of information in each of the authentication object may vary. In some embodiments, proof of authorization is provided by digitally signing (e.g., by digitally countersigning) an authentication object generated by another authentication object manager.

In some embodiments, the service provider or other system that verifies the authentication object that is submitted by the system that performs process 1500 requires that the devices implementing, respectively, the first authentication object manager and the second authentication object manager be within a specified proximity of one another. Accordingly, information provided by the first authentication object manager and the second authentication object manager may include information indicative of geographic locations such as GPS coordinates of each device. A system verifying the authentication object that is submitted may then determine whether the provided coordinates are sufficiently close.

Other variations include variations on which the first authentication object manager and second authentication object manager are implemented. As an illustrative example, the first authentication object manager may be implemented by a personal computer, such a notebook computer, tablet computing device, and the second authentication object manager may be implemented by a mobile device, such as a smartphone of the same user that operates the personal computer. Generally, authentication object managers participating in performance of the process 1500 may be implemented in various ways and in various smart devices including, but not limited to, smartphones, other "smart" devices (e.g., devices with computational and communication abilities) described herein. Such smart devices include, but are not limited to, smart watches, smart eyewear, smart clothing and generally any devices with sufficient computational and communicational abilities for implementing the techniques described herein and variations thereof.

Other variations, including numerous variations described above and below, may be incorporated into the operation of the first authentication object manager, second authentication object manager and/or others that may operate in accordance with variations of the process 1500. In some embodiments, authentication objects are used to enable a service provider to determine that requests for access are submitted pursuant to user input of a human operator, as opposed to automated agents that are programmed to operate independently of user input, such as are often referred to as bots, which submit requests to service providers for the various purposes such as obtaining information in an automated fashion. In some embodiments, authentication objects include information indicative of completion of a test configured to distinguish human operators from automated agents. Such tests may include, for example, Completely Automated Public Turing Tests (CAPTCHA), although the embodiments of the present disclosure are extendable to tests that are not necessarily classified as CAPTCHA.

Figure 16:
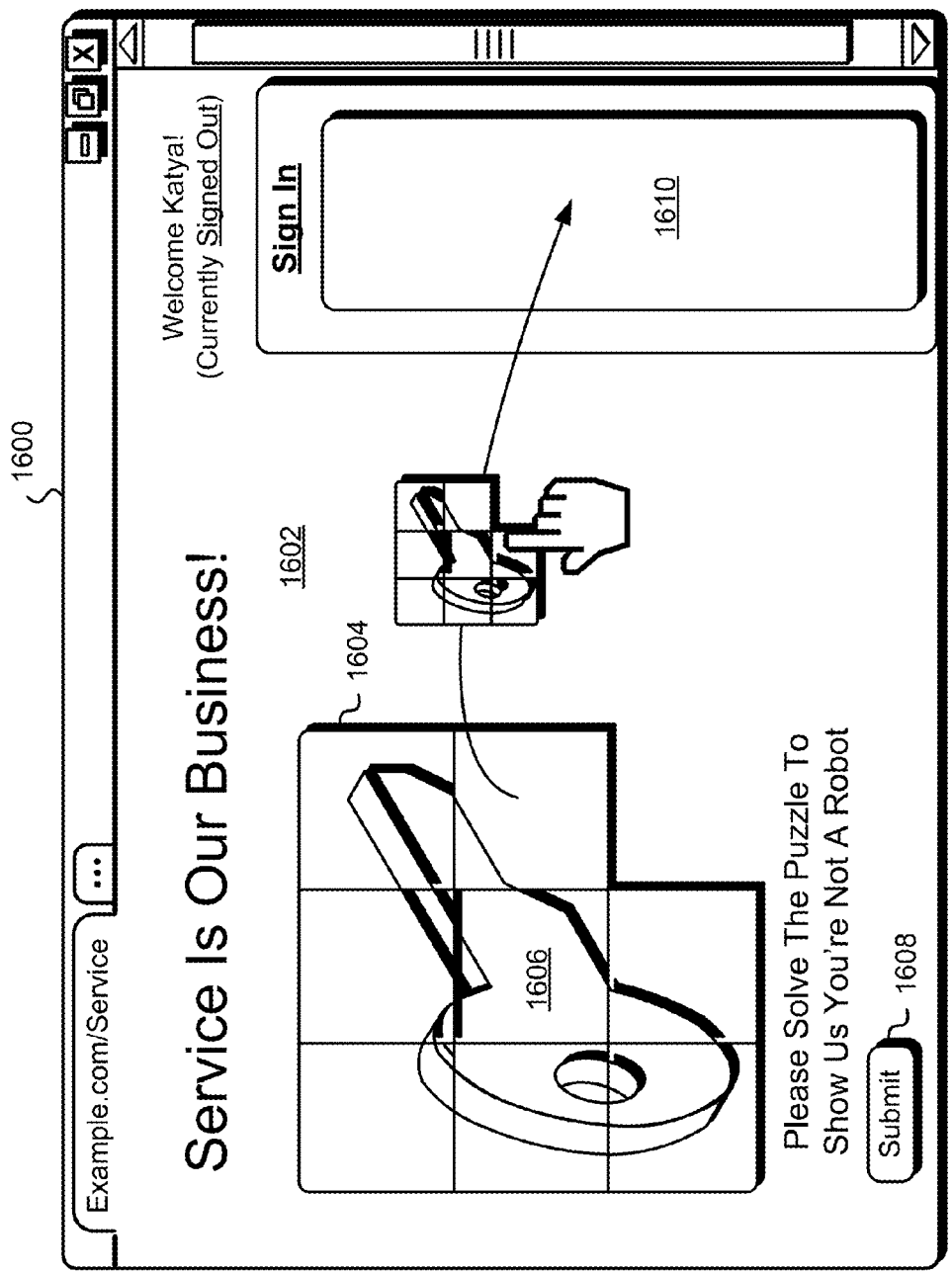
FIG. 16 shows an illustrative example of a user interface useable to distinguish automated agents from human operators in accordance with at least one embodiment.

FIG. 16, accordingly, shows an illustrative example of a browser 1600 display. In this example the browser displays a webpage 1602, which may be provided by a service provider such as described above. In an embodiment, to enable access to other portions of a website of which the webpage 1602 is a part, the webpage 1602 includes a CAPTCHA puzzle 1604 which, in this example, is the form of a sliding picture puzzle comprising eight squares that when arranged properly form an image of a key 1606. A solution to the CAPTCHA puzzle 1604 may be achieved by interacting with the blocks (e.g., through an input device, such as a mouse or touchscreen) by sliding blocks vertically or horizontally into adjacent and unoccupied squares until the squares collectively form an image of a subject of which the puzzle is based. In the example of FIG. 16, the CAPTCHA puzzle has been solved, and the image of the key 1606 appears on the display of the browser 1600; although when initially presented, the squares of the CAPTCHA puzzle 1604 may be in scrambled form until a user manipulates the squares of the CAPTCHA puzzle 1604 to generate the image of the key 1606.

In some embodiments, the user may submit a solution to the service provider by selecting a submit button 1608, although, alternatively, the solution to the CAPTCHA puzzle 1604 may be presented using a drag and drop or other operation. For example, as illustrated in FIG. 16, a user may drag the image of the completed CAPTCHA puzzle 1604 to an area 1610 of the display for authentication such as described above. As a result of performing the drag and drop operation, the proposed solution may be submitted to the service provider or other entity that verifies whether the solution is correct and, therefore, whether access should be provided.

The proposed solution to the CAPTCHA puzzle 1604 may be submitted in various ways in accordance with various embodiments. For example, the ability to drag and drop the CAPTCHA puzzle may be provided by an authentication object manager operating as a background process. As another example, the authentication object manager may be implemented in a script provided by the service provider in the code that is processed by the browser application 1600 to provide the display illustrated in FIG. 16. Generally any way by which the functionality illustrated in FIG. 16 and variations thereof are considered as being within the scope of the present disclosure. When a proposed solution is submitted to the service provider, the proposed solution may be configured in various ways in accordance with various embodiments. For example, in the illustrative example of FIG. 16, the squares of the CAPTCHA puzzle 1604 may be enumerated. An ordering of the squares determined by how the user has arranged the squares may be submitted to the service provider and, for verification, if the ordering matches an ordering for a correct solution of the CAPTCHA puzzle. As another example, code executing on the device providing the display 1600 may determine whether the CAPTCHA puzzle is solved correctly and provide a digitally signed attestation to the fact that the CAPTCHA puzzle was provided correctly. Other ways by which the solution may be encoded and transmitted to the service provider are considered as being within the scope of the present disclosure.

Figure 17:
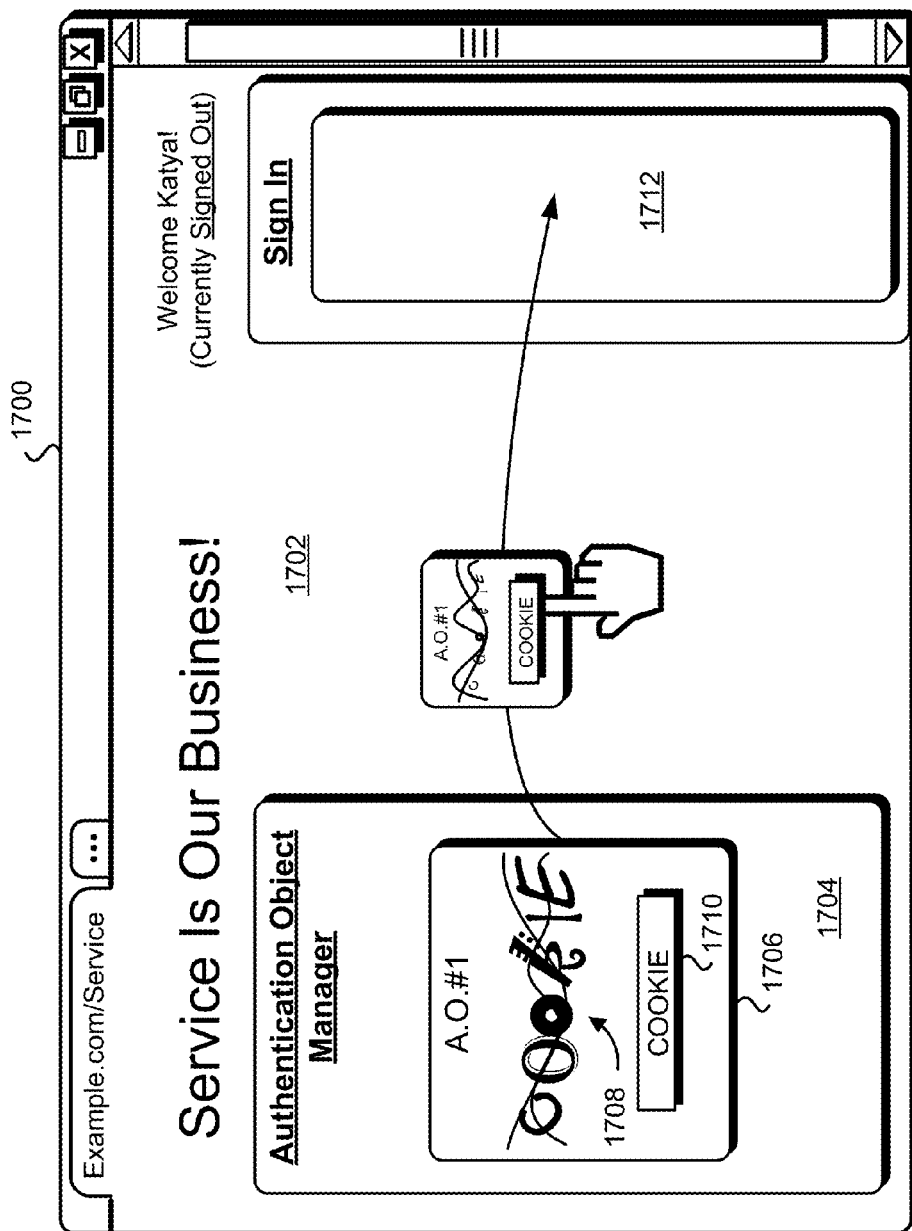
FIG. 17 shows an illustrative example of an interface useable to detect automated agents from human operators in accordance with at least one embodiment.

Various embodiments of the present disclosure that utilize tests to distinguish automated agents from human operators may also be combined with techniques described above. FIG. 17 accordingly shows an illustrative example of a display of a browser application 1700. In this embodiment, illustrated in FIG. 17, the browser application displays a webpage 1702 of a website for which authentication is required for at least some access. Accordingly, superimposed on the webpage or as part thereof an authentication object manager 1704, such as described above, appears superimposed on the webpage 1702. As described above, the authentication object manager 1704 may be an application configured to manage authentication objects to enable the various advantages described herein. Accordingly, as illustrated in FIG. 17, the authentication object manager 1704 provides a display of a representation 1706 of an authentication object. It should be noted that while FIG. 17 shows a single authentication object 1706, the authentication object manager 1704 may provide multiple representations of multiple different authentication objects.

In this embodiment, the representation of the authentication object includes a CAPTCHA test (i.e., CAPTCHA puzzle) 1708. Provided with the CAPTCHA test is a field 1710, which enabled as part of the test a user to enter alpha-numeric input corresponding to an image displayed on the CAPTCHA test 1708. In this particular example, the CAPTCHA test includes presentation of the word "cookie" with additional unnecessary lines and letters morphed and taking different forms to prevent an automated text recognition program from determining what word is in the image. In this example, the word is cookie and to correctly solve the CAPTCHA a user in this embodiment must type the word cookie into the field 1710 and submit the solution to the CAPTCHA test 1708. In this particular example, the solution to the CAPTCHA test 1708 is submittable by use of a drag and drop operation from the authentication object manager 1704 to an area 1712 of the display for authentication such as described above.

As with all embodiments described herein, other types of input in addition to or instead of drag and drop operations may also be used to indicate that an authentication object is to be used for authentication. For example, certain touch screen gestures (e.g., the drawing of a dollar sign) may indicate an intent to use an authentication object for authentication. As another example, certain physical movements (e.g., certain arm gestures) captured by a camera of a device may indicate an intent to use an authentication object for authentication. As yet another example, voice commands captured by a microphone of a device may indicate an intent to use an authentication object for authentication. An accelerometer of a device may be utilized to detect certain movements of the device (e.g., shaking) corresponding to an intent to use an authentication object for authentication. Generally, various embodiments may utilize different types of input to indicate an intent to use an authentication object for authentication and the input may come from one or more input devices and/or other sensors of one or more devices. Further, such input may also be used in other ways in connection with authentication objects. For example, certain input may be used to indicate an intent to use an authentication object manager and other input may be used to select an authentication object using the authentication object manager. Upon indication that an authentication object is to be used for authentication, the authentication object may be generated to include a solution to the CAPTCHA puzzle 1708 and submitted to a service provider or other system that verifies the CAPTCHA and/or other information in the authentication object.

Figure 18:
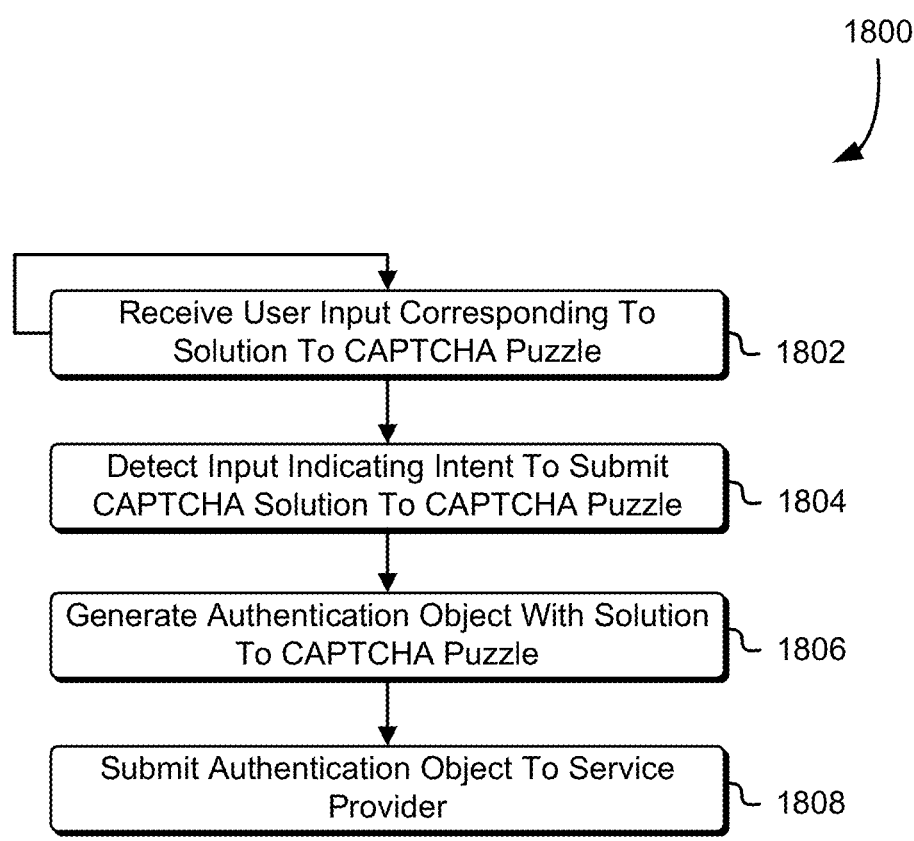
FIG. 18 shows an illustrative example of a process for providing an authentication object in accordance with at least one embodiment.

FIG. 18 shows an illustrative example of a process 1800 for providing an authentication object for use in authentication where the authentication object includes a solution to a CAPTCHA puzzle in accordance with various embodiments. The process 1800 may be performed by any suitable system such as a system implementing an authentication object manager such as described above in connection with FIG. 17 or FIG. 16.

In an embodiment, the process 1800 includes receiving 1802 user input corresponding to solution of a CAPTCHA puzzle. User input may be repeatedly received as the user attempts a solution to the CAPTCHA puzzle. For example, as the user types in letters of a CAPTCHA puzzle that requires user to type in a word, or as the user manipulates images in another test, or otherwise attempts to solve a CAPTCHA puzzle. At some point when the user intends to submit a solution to the CAPTCHA puzzle, the process 1800 may include detecting user input indicating an intent to submit the CAPTCHA solution to the CAPTCHA puzzle. The input may be, for example, a drag and drop operation, such as described above in connection with FIG. 17 or submission of a button such as described in FIG. 16; although other types of input indicating an intent to submit a solution to a CAPTCHA puzzle are considered as being within the scope of the present disclosure.

Once the input indicating an intent to submit the solution to the CAPTCHA puzzle has been detected 1804, the process 1800 may include generating an authentication object that encodes the solution to the CAPTCHA puzzle that was input by the user. The authentication object may be generated to include various types of information, such as described above, including, but not limited to, information described above in connection with FIG. 5 and other information explicitly discussed above. In addition, an authentication object may also encode a solution to the CAPTCHA puzzle or an attestation that the CAPTCHA puzzle has been correctly solved. The generated authentication object may then be submitted 1808 to a service provider on behalf of which the CAPTCHA puzzle was presented to the user for solving. In this manner, a service provider or other system that verifies an authentication object can be relatively sure that the authentication object was submitted pursuant to user input and not input of an automated agent operating independently of user input.

Other variations of integrating CAPTCHA puzzles and other tests into various techniques described herein are also considered as being within the scope of the present disclosure. For example, in some embodiments an authentication object manager may require the solution to a CAPTCHA puzzle before providing access to an authentication object. An attestation provided with the authentication object may include an attestation to the executable code of the authentication object manager. If such attestation indicates that the executable code has not been modified, a service provider system may operate on the assumption that a human operator is operating the computer system with which the service provider system communicates.

Figure 19:
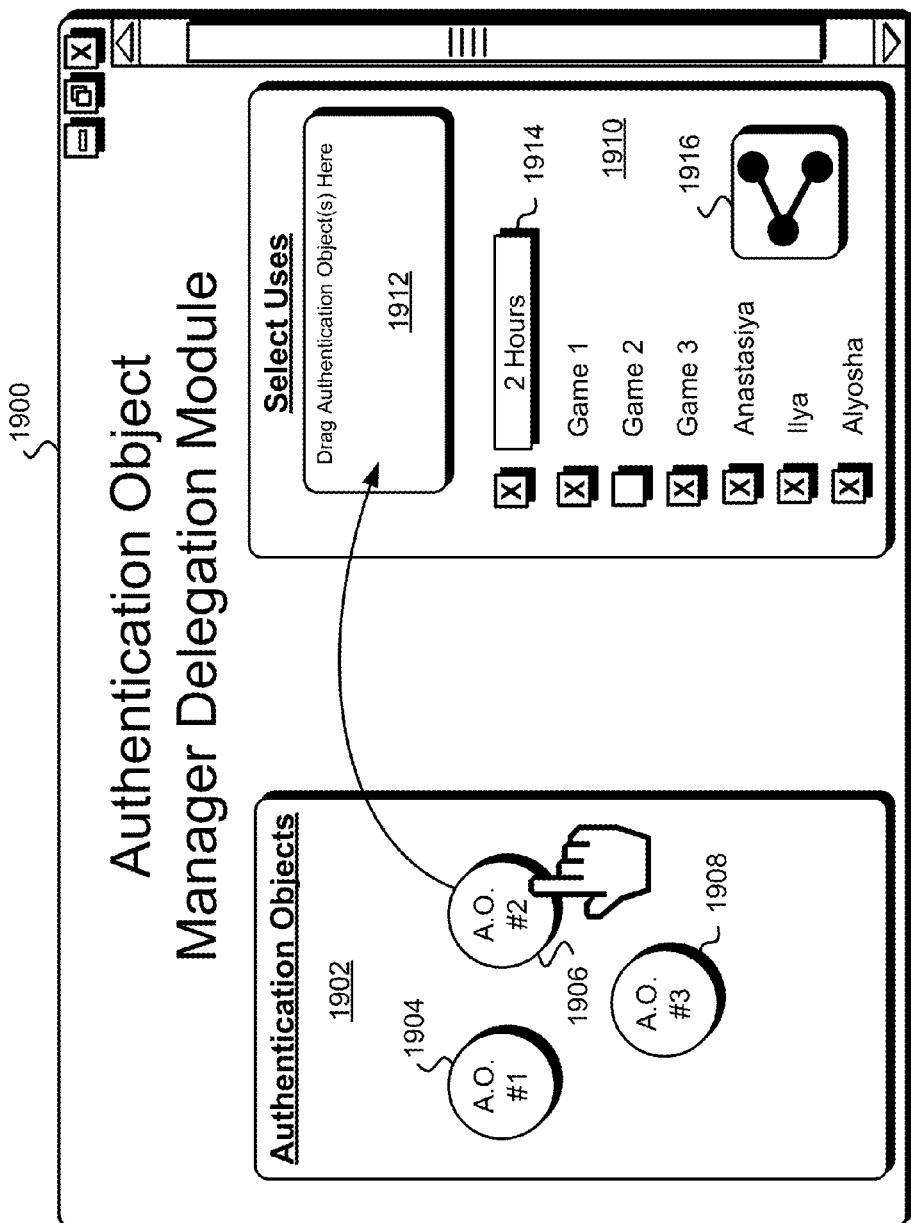
FIG. 19 shows an illustrative example of an interface useable to use an authentication object to delegate access in accordance with at least one embodiment.

Other variations are also considered as being within the scope of the present disclosure. For example, the various techniques described herein can be used to utilize authentication objects to generate other authentication objects which are usable to delegate some or all access obtainable through the authentication objects. FIG. 19, for example, shows an illustrative example of a display of an application, which in this embodiment is a module of authentication object manager 1900. In this embodiment, the authentication object manager provides a component 1902 of the display for presenting representations of authentication objects, such as described above. In this particular example, three representations of authentication objects are provided; including a first representation 1904, a second representation 1906 and a third representation 1908.

In an embodiment, another portion of the display 1900 provides interface elements that enable a user to use an authentication object to delegate some or all access obtainable using the authentication object. In this example, a delegation component 1910 provides the elements. In an embodiment, the delegation component 1910 includes an area 1912 into which an authentication object may be dragged and dropped for the purpose of selection of an authentication object by virtue of selection of that authentication object's representation from the authentication object component 1902. Although other ways of selecting authentication objects, including checkboxes, menu selections and/or otherwise, are considered as being within the scope of the present disclosure.

Further, as illustrated in FIG. 19, the delegation component 1910 includes a number of user interface elements that enable selection of parameters for delegation of access using the selected authentication object. In this example, the interface elements for providing parameters of delegation are presented in the form of checkboxes selectable to indicate inclusion of a corresponding parameter and, in one instance, a field to enable input of parameters which, in this example, is an amount of time (although an amount of time can be selected through a drop-down menu or in other ways). In this particular example, the parameters selectable through the delegation component 1910 include a field 1914 that either may use to indicate a number of hours for which the delegation is active. The amount of time may be measured from various points in time and various embodiments, such as from the creation of an authentication object that is used for delegation or from a first use of an authentication object created for the purpose of delegation.

Other parameters include parameters enabling a user to select from a number of uses for which an authentication object created for the purpose of delegation is usable. In this example, checkboxes appear for games respectively identified in the figure as Game 1, Game 2, and Game 3. In this manner, if a checkbox for a game is checked, an authentication object generated for the purpose of delegation may be used to play the corresponding game. A number of checkboxes appear for users for which delegation is authorized. Next to the checkboxes may include identifiers such as the names of the users. In this manner, a parent, for example, may use the authentication object manager 1900 to create authentication objects that are usable to meter which activities are playable by which children and for how long through the use of authentication objects. Users may also be able to be specifiable through, for instance, input of an account username for one or more games.

A share button 1916 in the delegation component 1910 enables a user to provide an authentication object created for the purpose of delegation to a delegatee, that is, a person for whom access is to be delegated, such as a child of a parent operating the authentication object manager. In various embodiments, selection of the share button 1916 enables a user of the authentication object manager to make an authentication object usable for delegated access to be available to one or more delegatees. Selection of a share button may, for example, provide a number of options by which the delegation object is to be made available. Examples include, but are not limited to, providing an authentication object in an electronic message, such as an electronic mail message, a short message service message, or a message sent through a social network. In addition, authentication objects may be made available through the authentication object manager or another authentication object manager. For example, if the authentication object manager illustrated in FIG. 19 is executed on a computer system, a child may log into an operating system of that computer system and/or into an instance of the authentication object manager using the child's credentials. As a result of the child having logged in, the authentication object manager may provide authentication objects available to that child, including one or more authentication objects created for delegation of access by a parent.

Numerous other types of parameters and manners by which parameters are settable through a user interface are considered as being within the scope of the present disclosure. For example, parameters may specify how many times a delegatee is able to play a game. Another example parameter is a multiplicity of the delegation authentication object. The multiplicity parameter may be set, for example, to indicate a number of different authentication objects with same parameters to be created. The multiplicity may be used, for instance, to enable a parent to provide a child a number of authentication objects. Each authentication object may be usable for a limited time, such as for an hour or such as an unspecified amount of time, such as an instance of a game play, viewing of a video, listening of an audio file and the like. The multiplicity may be used to enable the child a limited amount of delegated access, to be used at the discretion of the child (e.g., all at once or spread out over an amount of time).

As noted, the interface 1900 discussed above is illustrative in nature and variations are considered as being within the scope of the present disclosure. For instance, in some examples, the delegation component 1910 is updated dynamically as authentication objects are selected. For instance, an authentication object for a first use (e.g., a particular game) may be selected and parameters relevant to that first use may appear in the delegation component 1910 as a result of the selection of the authentication object. As authentication objects are selected, the delegation component may update accordingly to enable setting of relevant parameters.

Figure 20:
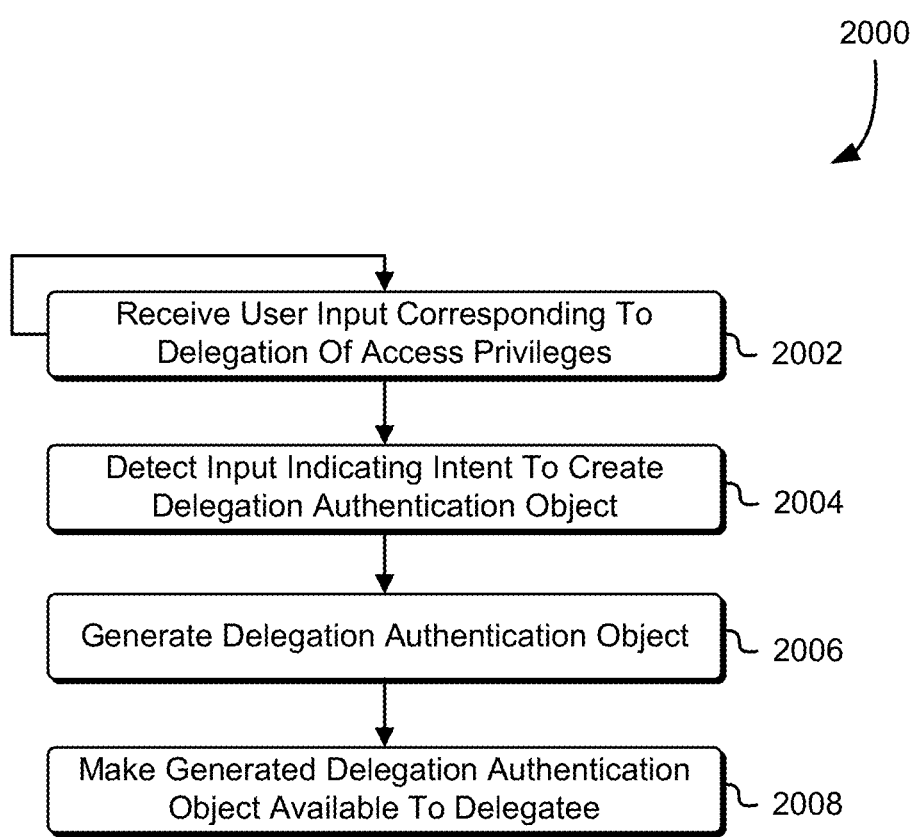
FIG. 20 shows an illustrative example of a process for making delegated access available in accordance with at least one embodiment.

Other variations are considered as being within the scope of the present disclosure. FIG. 20 shows an illustrative example of a process for delegating access using authentication objects in accordance with an embodiment. The process 2000 in FIG. 20 may be performed by any suitable system, such as a computer system, implementing an authentication object manager such as described above. In an embodiment, the process 2000 includes receiving user input corresponding to delegation of access privileges. The user inputs may be received, for example, through a user interface, such as the example user interface described above in connection with FIG. 19. User input may be received until a user is satisfied with parameters set in accordance with the user input, such as by manipulating interface elements such as described above in connection with FIG. 19. In an embodiment, the process 2000 includes detecting 2004 user input indicating an intent to create a delegation authentication object, which, in an embodiment is an authentication object created to delegate access privileges to a system from one user to one or more other users.

In an embodiment, the input is user input in connection with another authentication object, such as described above in connection with FIG. 19. For example, a user may use one authentication object corresponding to an amount of privileges with one or more systems and use that authentication object to create a delegation object usable for a subset of those privileges. Once the user input indicating intent to create the delegation authentication object has been detected 2004, the process 2000 may include generating 2006 a delegation authentication object. In an embodiment, the delegation authentication object may be generated to include some or all information described above, such as information described above in connection with FIG. 5.

Other information corresponding to the parameters of delegation set by the user may also be encoded in the delegation authentication object. For example, the delegation authentication object may include information serving to limit use of the delegation authentication object either by specifying which uses the delegation authentication object is usable for and/or by specifying uses for which the delegation authentication object is unusable. The delegation authentication object may also specify one or more users authorized to use the delegation authentication object. The one or more users specified to use the delegation authentication object may be specified in various ways, such as by identifiers of the users or by characteristics usable to determine users having those characteristics that may use the delegation authentication object successfully for access. Similarly, information may include users that are not authorized to use the delegation authentication object for access. Other information such as the duration for which the delegation authentication object is usable and other information serving to limit use of the delegation authentication object may be encoded in the delegation authentication object.

As noted above, generating an authentication object, such as a delegation authentication object, may include making the authentication object cryptographically verifiable through the use of encryption and/or digital signatures. In this manner, parameters encoded in the authentication object are not changeable without affecting the ability of the authentication object to be cryptographically verified. For example, if cryptographic verifiability is achieved through encryption, access to a suitable cryptographic key for decrypting the authentication object may be necessary to modify the authentication object. As another example, if a digital signature is used for cryptographic verifiability, a change to one or more parameters would nearly certainly (i.e., with zero or near zero probability) cause an attempt to verify the digital signature to fail due to computation of a digital signature for checking would result in a different digital signature.

Numerous variations, of course, are considered as being within the scope of the present disclosure, including variations in which parameters for delegation are not encoded in the delegation object, but are otherwise set. For example, a system that utilizes delegation authentication objects to determine whether to provide users access to the system may utilize one or more defaults, such as a default amount of time for which a delegation authentication object is usable. As another example, processes for utilizing authentication objects for delegation of access rights may vary in accordance with various embodiments. In one example, some or all parameters for delegation are maintained outside of a delegation authentication object. A user may, for instance, log into a system supporting delegation of access rights. The user may, while logged on, through an interface of the system (e.g., web page or application interface) set parameters for delegation. A delegation authentication object may be created without at least some parameters for delegation. The authentication object may, for instance, encode an identifier for a delegatee but not limits on use of the delegation authentication object. When used, the system may verify the delegation authentication object and access stored parameters to determine whether and how much access to provide.

Other variations include variations serving to limit the amount of time for which a delegation authentication object is usable. For example, in some embodiments, the amount of time is specifically encoded in the delegation authentication object, although limits on time may not be specified explicitly. For example, a delegation authentication object may specify that a delegatee is able to use a delegation authentication object to play a certain game a number of times, regardless of how long play of the game lasts. Other variations are also considered as being within the scope of the present disclosure and the various embodiments are not limited to those described explicitly herein.

Figure 21:
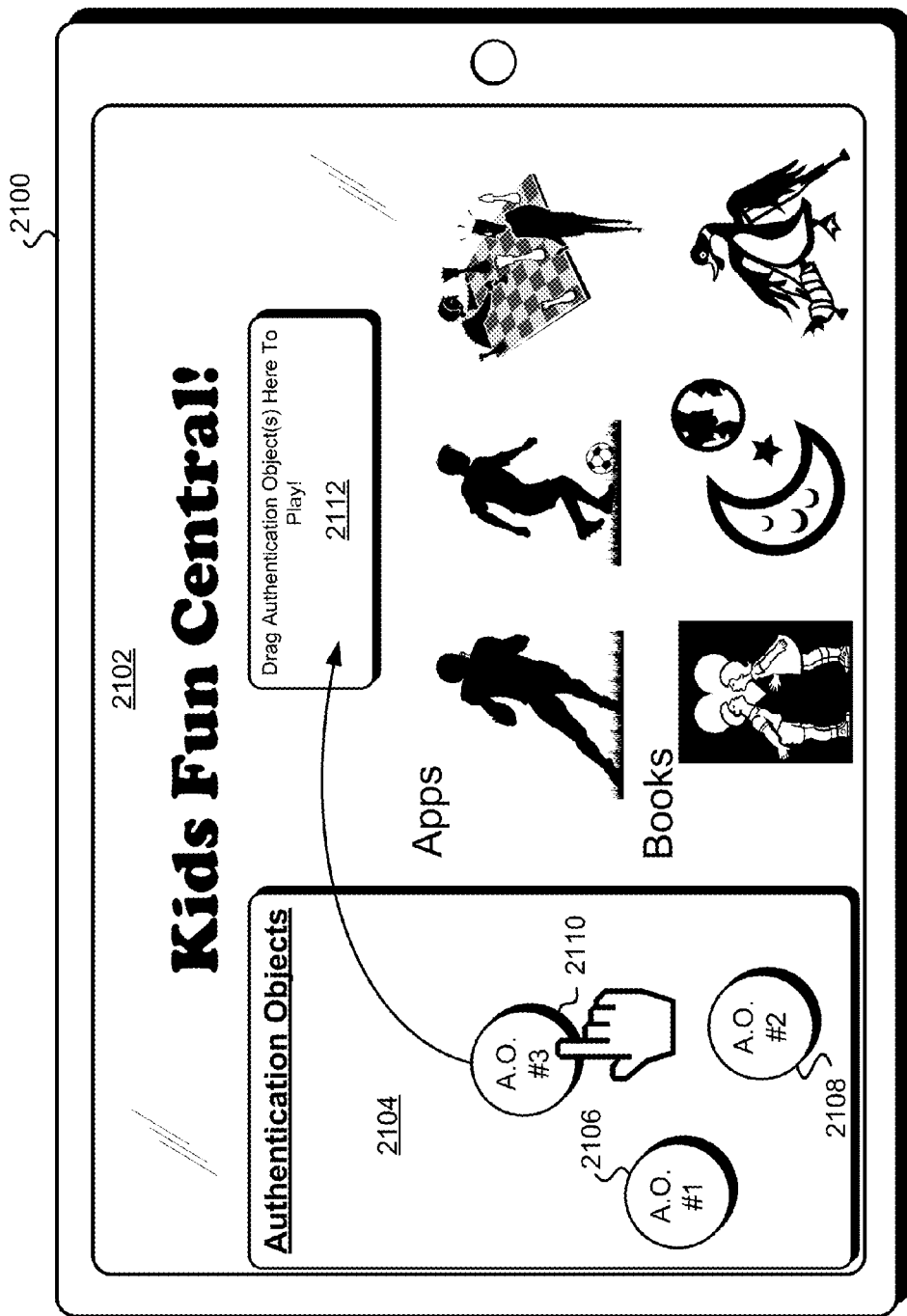
FIG. 21 shows an illustrative example of an interface usable to use a delegated authentication object in accordance with at least one embodiment.

FIG. 21 shows an illustrative example of a device 2100 that may be used by a delegatee to utilize delegation authentication objects created in accordance with various embodiments. In this example, the device 2100 may be a tablet computing device or mobile device, although the techniques described herein are applicable to other devices, including those discussed elsewhere herein. In the illustrated example, the device 2100 displays a graphical user interface 2102 of an application which, in this example, is "Kids Fun Central" although the techniques described herein are applicable to applications and systems providing services in other genres. In this example, Kids Fun Central is an application that provides for access to a collection of electronically consumable items directed toward children. The electronically consumable items may include, but are not limited to multi-media resources such as electronic games, electronic books and instances of digital media (e.g., movies, television shows, audio recordings). A parent or other authority may allow a child to use the Kids Fun Central application to select and consume selected electronically consumable content that is suitable for the child. In some embodiments, access to Kids Fun Central is provided by subscription.

Also illustrated in FIG. 21 is an authentication object manager which may be implemented as described above, such as by an independent application or a component of the Kids Fun Central application or an operating system used for the device 2100. In this example, the authentication object manager 2104 provides the ability to select authentication objects through selection of corresponding representations of authentication objects 2106, 2108, 2110. One or more of the authentication objects 2106, 2108, 2110 may be delegation authentication objects, such as described above. For example, the authentication object corresponding to the representation 2106 may be a general authentication object usable by the use of the Kids Fun Central application for a limited set of uses (e.g., reading electronic books available through the Kids Fun Central application). The authentication objects corresponding to the representations 2108, 2110 may be delegation authentication objects generated such as described above and usable for additional uses, such as playing electronic games in accordance with any limitations associated with the delegation authentication objects. The authentication object manager 2104 application may have received the delegation authentication objects over a network (e.g., if delegation was achieved using an authentication object manager of a different device) or through local storage (e.g., if delegation was achieved using the same authentication object manager 2104, such as by a different account of the operating system of the device 2102 and/or the authentication object manager 2104).

As discussed, a user may utilize the authentication object manager to select a representation (in this example, the representation 2110) and perform a drag and drop operation to drag the selected representation to an area 2112 of the display for authentication. It should be noted, however, that other ways of indicating use of an authentication object for use in authentication may be used, such as described above (e.g., through selection of a menu button or otherwise by causing the authentication object manager and/or authentication object representations to appear or by user input that causes a context-dependent selection of an authentication object to occur). Once user input has been received that indicates use of an authentication object for authentication, a system (e.g., the device 2102 or a remote system or a distributed system that includes the device 2102) may make an authentication determination and the ability to access electronically consumable items may be provided accordingly. In some embodiments, the display of the Kids Fun Central application changes in accordance with the access that has been delegated. For example, icons for applications that the user is able to select may appear while icons for other applications may be hidden from display or lightened to indicate an unavailability for selection. In other examples, the display does not change, but selection of a representation of an electronically consumable item (e.g., icon of an application) does not enable that item to be consumed (e.g., a corresponding application will not launch). Other variations are also considered as being within the scope of the present disclosure. For example, in some embodiments, the techniques described and suggested herein may be used to enable delegatees to become delegators. In the example of children delegatees, for instance, a child may utilize the techniques described herein to delegate some access that itself has been delegated to the child. The child may, for example, delegate to his or her siblings or friends or others where the relationships may be established through a social networking system. In some embodiments, delegated access may limit a number of text messages that can be sent and/or how much time is spent in a certain activity, such as interacting with an interface of a social network.

Authentication objects may appear in the interface of the authentication object manager 2104 in other ways in addition to or instead of the authentication objects having been delegated. For example, in some embodiments, users (e.g., children) are able to earn authentication objects through performing various activities, such as activities designated as educational, physical, etc. A first amount of time spent reading an electronic book or interacting with an educational application, for example, may earn an authentication object usable for an amount of time of play of an electronic game. As authentication objects are earned, they may appear in the interface of the authentication object manager 2104 to be used when the user desires. Such authentication objects may have an expiration so that there is a sufficient correlation between when the authentication objects are earned and when they are used. Suitable techniques for rewarding various activities are disclosed in U.S. application Ser. No. 13/663,826, which is incorporated herein by reference. Rewards earned using such techniques may be redeemed through the use of authentication objects.

Figure 22:
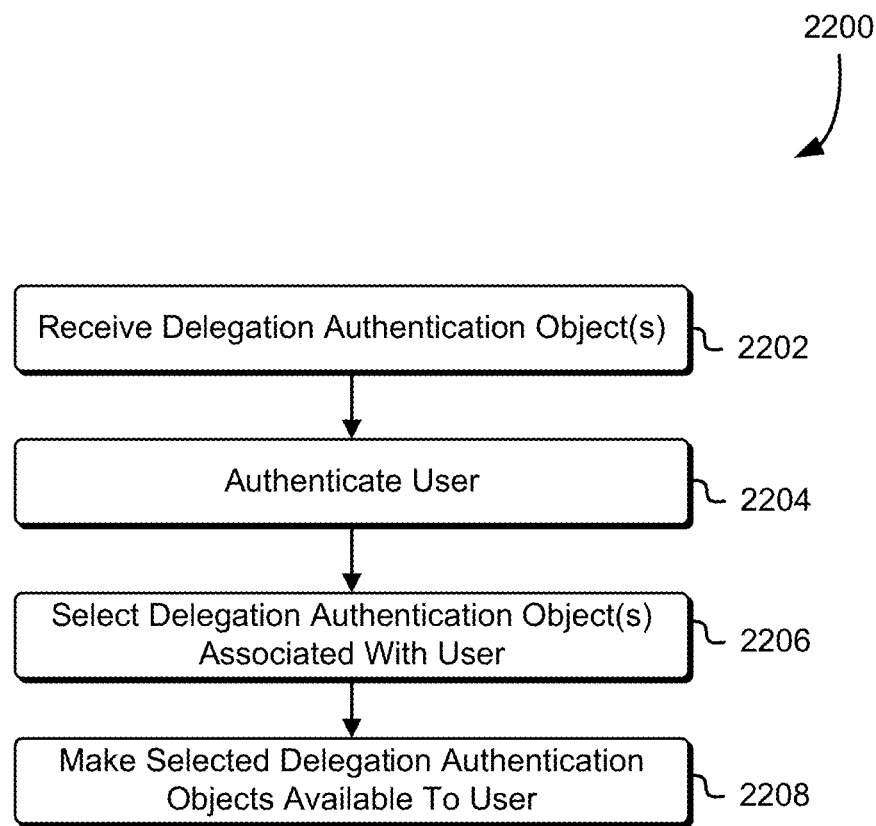
FIG. 22 shows an illustrative example of a process for delegating access in accordance with at least one embodiment.

FIG. 22 shows an illustrative example of a process 2200 that may be used to delegate access in accordance with at least some embodiments. The process 2200 may be performed by any suitable system, such as a system implementing an authentication object manager, such as the device 2100 described above in connection with FIG. 21. In an embodiment, the process 2200 includes receiving 2202 one or more delegation authentication objects. As noted, receiving 2202 the one or more delegation authentication objects may be performed in various ways, such as by receiving some or all of the one or more delegation authentication objects over a network from another device implementing another authentication object manager and/or by receiving some or all of the delegation authentication objects from local storage (e.g., when the same authentication object manager has been used for delegation).

The process 2200 may also include authenticating 2204 a user. The user may be authenticated 2204 in various ways in accordance with various embodiments. For example, the user may authenticate with an authentication object, such as described above, or in other ways, such as by providing a username and password. As an example, the user may be authenticated as part of launching an application, such as the Kids Fun Central application described above in connection with FIG. 21. Further, while FIG. 22 shows authentication of the user occurring after receiving 2202 one or more authentication objects, authentication may be performed at other times such as before receipt 2202 of some or all authentication objects or before receiving one or more authentication objects but before receiving one or more other authentication objects. Generally, unless otherwise clear from context, operations described herein and illustrated in a particular order may be performed in different orders in accordance with various embodiments. Further, while FIG. 22 shows a process that includes authenticating 2204 the user, variations include embodiments where the user is not authenticated, but merely identified without authentication.

In an embodiment, the process 2200 includes selecting 2206 one or more authentication objects associated with the user. The selected 2206 one or more authentication objects may include one or more of the received 2202 delegation authentication objects. As an example, a system performing the process 2200 may have multiple user profiles. Selecting 2206 one or more authentication objects may include selecting those for a particular user that has logged in. For instance, if one child has logged in and the system has received delegation authentication objects each specific to a different child, only those delegation authentication objects for the logged-in child may be selected and any other non-delegation applicable authentication objects may be selected as well. Generally, any way by which applicable authentication objects (both delegation authentication objects and other authentication objects) are selected may be used. When the selected one or more delegation authentication objects are selected, the selected delegation authentication objects may be made available to the user, such as described above (e.g., by making one or more representations of the one or more selected authentication objects available for selection through an interface of an authentication object manager).

While FIG. 22 shows a process for making delegated authentication objects available to others, the various techniques described herein may also be used to revoke authentication objects that have been delegated. For example, a user interface used by a user that has delegated access may provide the ability to view authentication objects that have been delegated and the ability to revoke one or more authentication objects. When an authentication object is revoked in this manner, one or more communications to another authentication object manager may serve as notification of the revocation, thereby causing the other authentication object manager to reconfigure accordingly, such as by removing the ability to select a representation of the delegated authentication object. One or more communications may also be transmitted to a service provider system to notify the system and cause reconfiguration in accordance with the revocation such that, if a revoked delegated authentication object is attempted to be used, the attempt will fail. In embodiments where the same authentication object manager is used for both the delegation authentication objects and use of delegated authentication objects, a local reconfiguration may be made in accordance with a revocation.

In some embodiments, the various techniques described herein with respect to computing environment attestations may be part of a provisioning process for authentication objects. For example, in some embodiments, at least some authentication objects are able to be provisioned if an attestation to the computing environment indicates that the computing environment is in an approved state. Such a requirement may be enforced by the authentication object manager and/or a remote system. Other security requirements may also be enforced in connection with the provisioning of authentication objects.

Figure 23:
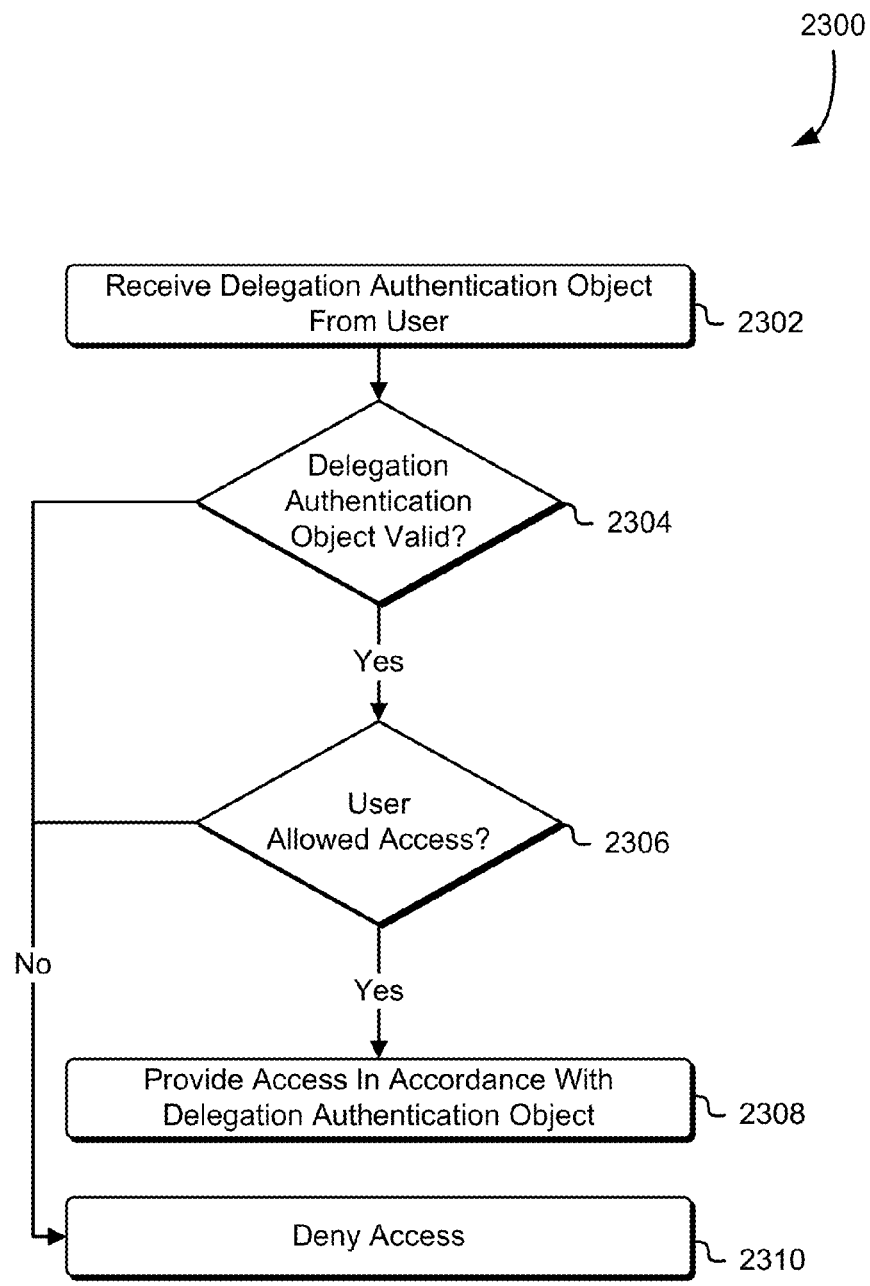
FIG. 23 shows an illustrative example of a process for using a delegated authentication object in accordance with at least one embodiment.

FIG. 23 shows an illustrative example of a process 2300 for utilizing an authentication object for access in accordance with at least one embodiment. The process 2300 may be performed by any suitable system, such as a system that verifies authentication objects. In an embodiment, the process 2300 includes receiving 2302 a delegation authentication object from a user. The delegation authentication object may be received 2302 in various ways. For example, the delegation authentication object may be received over a network if the system performing the process 2300 is remote from the system to which access would be provided upon successful validation of the delegation authentication object. As another example, the authentication object may be received over a local communication (e.g., a communication bus of a device) if the system performing the process 2300 is a device that is the same as the device that provided the authentication object for authentication. (For instance, a locally executing application or other programming module may require authentication which may be performed through authentication objects managed by a local (i.e., executing on the same device) authentication object manager. The delegation authentication object may be received 2302 in different contexts, such as in a request for access to one or more resources or a request to authenticate to have the ability to access one or more resources at a later time.

A determination may be made 2304 whether the delegation authentication object is valid. Determining 2304 whether the delegation authentication object is valid may include cryptographically verifying the delegation authentication object in accordance with one or more cryptographic algorithms used to make the delegation authentication object cryptographically verifiable, such as described above. Determining 2304 whether the delegation authentication object is valid may also include determining whether any validity conditions are satisfied, such as if a lifetime encoded in or otherwise associated with the delegation authentication object has expired. Other validity conditions include, in some embodiments, contextual conditions, such as conditions dependent on a time of submission, a device submitting the delegation authentication object, a geographic location from which the delegation authentication object is submitted and/or others.

If determined 2304 that the delegation authentication object is valid, the process 2300 may include determining 2306 whether the user is allowed access by way of the delegation authentication object. The determination 2306 whether the user is allowed access may be made in various ways in accordance with various embodiments. For example, if the delegation authentication object is received in connection with a request for specific access, it may be determined whether the specific access requested is allowed by the delegation authentication object. As another example, a determination may be made 2306 whether the delegation authentication object provides any access, such as by defining one or more attributes determinative of an amount of access or by specifically specifying which access is to be granted.

If determined 2306 that the user is allowed access, the process 2300 may include providing access in accordance with the delegation authentication object. As noted, providing access may be performed in various ways in accordance with various embodiments. For example, access may be provided by updating a graphical or other user interface to enable access through the interface. As another example, a credential (e.g., digital token) may be given to the user's device to enable the user's device to submit requests for access with the token, thereby enabling a system receiving the request/token to provide access as a result of validating the token. As yet another example, a system backend may perform one or more operations that enable the access to be had by the user. Generally, any way by which access may be provided may be used in accordance with various embodiments and the variations by which access may be provided may be used with the various techniques described throughout the present disclosure. Returning to the illustrated embodiment, if determined 2304 that the delegation authentication object is invalid and/or if determining 2306 that the user is not allowed access, the process 2300 may include denying 2310 access. Denying access may be performed in various ways in accordance with various embodiments, such as by transmitting a message indicating a denial of access, which may encode one or more reasons for denial, by refusing (e.g., not fulfilling) one or more requests for access, or simply doing nothing and, as a result, having the effect of keeping access from being provided.

As noted above, numerous variations of the above techniques are considered as being within the scope of the present disclosure. As discussed above, for instance, a user may utilize or otherwise be associated with multiple authentication object manager applications which may be locally hosted (e.g., on devices of the user) and/or remotely hosted (e.g., on a service provider server). The various embodiments discussed herein may also include performing synchronization operations among the authentication object managers associated with a user. In some examples, upon provisioning of an authentication object, such as described in connection with the various techniques described above, a representation of the authentication object may become available in each of multiple authentication object managers. A service provider server, for instance, may be configured to track (e.g., with an associated database) provisioned authentication objects (and their expirations and/or other limitations on validity) and communicate with registered authentication object managers to cause the authentication object managers to update their representations of authentication objects accordingly. Decentralized consensus protocols, such as Paxos, may also be used by authentication object managers for the purpose of maintaining consistency. In this manner, when authentication objects are added or revoked, authentication object managers may be updated accordingly.

Figure 24:
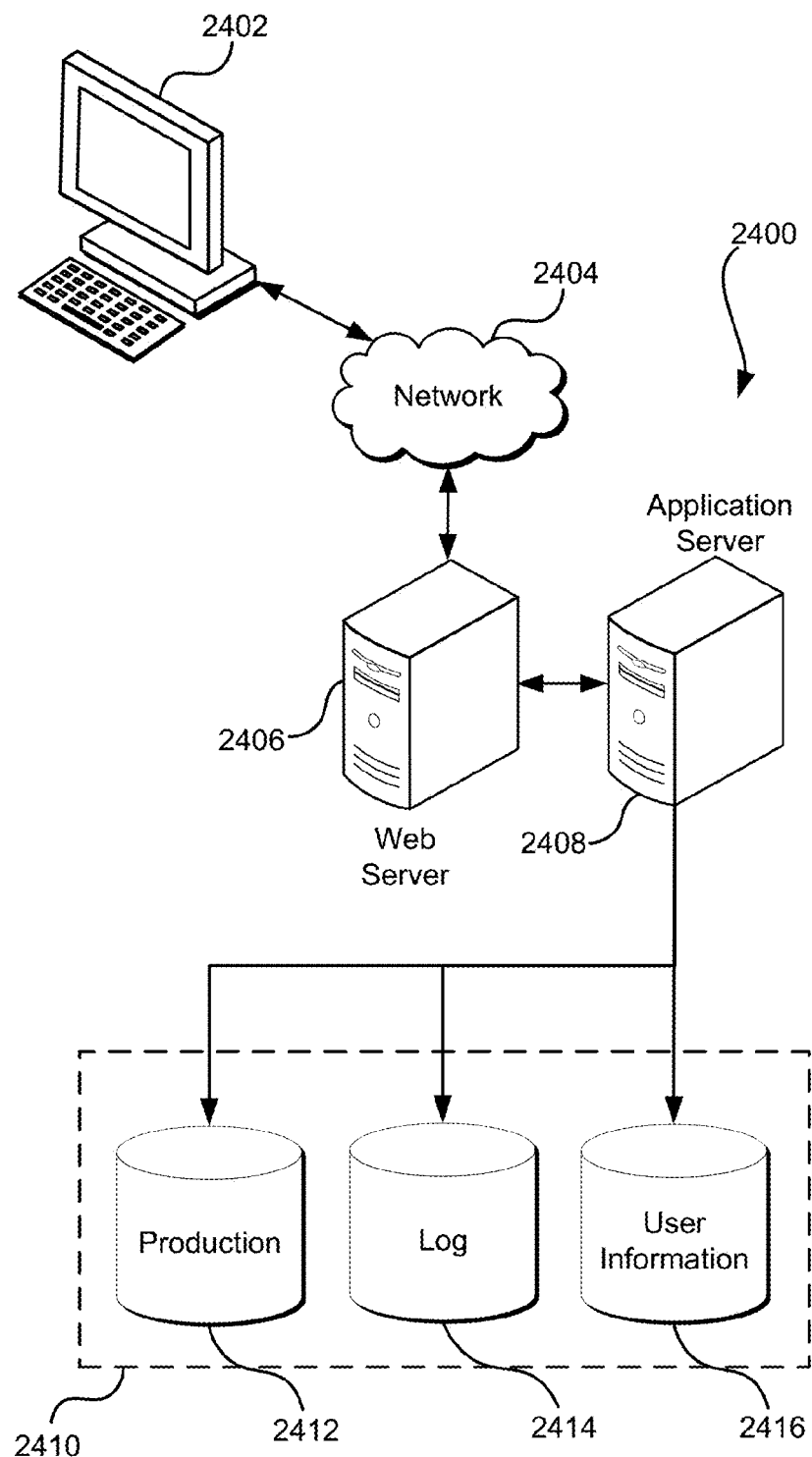
FIG. 24 illustrates an environment in which various embodiments can be implemented.

FIG. 24 illustrates aspects of an example environment 2400 for implementing aspects in accordance with various embodiments. As will be appreciated, although a web-based environment is used for purposes of explanation, different environments may be used, as appropriate, to implement various embodiments. The environment includes an electronic client device 2402, which can include any appropriate device operable to send and/or receive requests, messages or information over an appropriate network 2404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 2406 for receiving requests and serving content in response thereto, although for other networks an alternative device serving a similar purpose could be used as would be apparent to one of ordinary skill in the art.

The illustrative environment includes at least one application server 2408 and a data store 2410. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 2402 and the application server 2408, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 2410 can include several separate data tables, databases, data documents, dynamic data storage schemes and/or other data storage mechanisms and media for storing data relating to a particular aspect of the present disclosure. For example, the data store illustrated may include mechanisms for storing production data 2412 and user information 2416, which can be used to serve content for the production side. The data store also is shown to include a mechanism for storing log data 2414, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 2410. The data store 2410 is operable, through logic associated therewith, to receive instructions from the application server 2408 and obtain, update or otherwise process data in response thereto. The application server 2408 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 2402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 24. Thus, the depiction of the system 2400 in FIG. 24 should be taken as being illustrative in nature and not limiting to the scope of the disclosure.

Embodiments of the disclosure can be described in view of the following clauses:

1. A computer-implemented method, comprising:
under the control of a computing device configured with executable instructions,
generating a graphical user interface that makes available for selection a plurality of graphical representations, at least a subset of the graphical representations including a graphical representation that represents a set of actions for authenticating an identity with a service provider system;
receiving, from a user input device, user input indicating a user selection from the plurality of graphical representations of the graphical representation and a request to authenticate with the service provider system;
as a result of receiving the user input:
obtaining a cryptographically verifiable attestation to a state of a computing environment associated with the computing device;
obtaining an authentication claim that is based at least in part on the obtained cryptographically verifiable attestation and that corresponds to the selected graphical representation, the authentication claim sufficient for authenticating the identity with the service provider system; and
providing the obtained authentication claim to the service provider system so that the service provider system can authenticate the identity using the authentication claim.

2. The computer-implemented method of clause 1, wherein:
obtaining the cryptographically verifiable attestation of the computing environment further includes:
receiving a cryptographically verifiable attestation from a trusted platform module of the computing device; and
the attestation is cryptographically verifiable as a result of comprising a digital signature generated by the trusted platform module.

3. The computer-implemented method of clauses 1 or 2, wherein the cryptographically verifiable attestation of the computing environment is based at least in part on output of a cryptographic hash function applied to at least a portion of executable instructions of at least one of firmware of the computing device, an operating system of the computing device, or an application of the computing device.

4. The computer-implemented method of any of clauses 1 to 3, wherein:
the graphical user interface is of an application that manages the graphical representations; and
the cryptographically verifiable attestation of the computing environment further includes at least an attestation as to a state of the application.

5. The computer-implemented method of any of clauses 1 to 4, wherein:
the authentication claim is based at least in part on at least one long-term credential necessary for authentication with the service provider system; and
providing the authentication claim is performed without requiring input of the at least one long-term credential between selection of the representation and providing the authentication claim to the service provider system.

6. The computer-implemented method of any of clauses 1 to 5, wherein at least a portion of the authentication claim is encrypted using a public cryptographic key corresponding to a private cryptographic key accessible to the service provider.

7. A computer system, comprising:
one or more processors; and
memory including executable instructions that, when executed by the one or more processors, cause the computer system to:
provide a set of representations for selection via an interface, at least a subset of the set of representations associated with a set of actions for authenticating an identity with a service provider;
receive a selection of the representation from the set of representations;
as a result of the selection of the representation, obtain an authentication claim that is sufficient for authenticating the identity as a result of the attestation at least including an attestation of a computing environment associated with the computer system; and
provide the obtained authentication claim for authentication.

8. The system of clause 7, wherein the representation further comprises a graphical representation and the interface is a graphical user interface.

9. The system of clauses 7 or 8, wherein the executable instructions that cause the system to obtain the authentication claim further cause the computer system to generate the authentication claim in response to receipt of the selection of the representation.

10. The system of any of clauses 7 to 9, wherein the attestation is cryptographically verifiable using a cryptographic key.

11. The system of any of clauses 7 to 10, wherein the attestation of the computing environment further comprises output of a cryptographic hash function applied to at least a portion of executable instructions of an application of a computing device that generated the attestation.

12. The system of any of clauses 7 to 11, wherein the attestation further includes information indicating that a task configured to distinguish human operators from automated agents was performed.

13. The system of clause 12, wherein:
the information indicating that the task configured to distinguish human operators from automated agents further includes information including purported proof of successful performance of the task; and
the attestation being valid further requires verification of the purported proof.

14. A non-transitory computer-readable storage medium having stored thereon executable instructions that, when executed by one or more processors of a computer system, cause the computer system to at least:
receive input indicating a selection, via an interface and from a set of representations, of a representation of a set of actions for authenticating an identity;
as a result of the selection of the representation, obtain an authentication claim, the authentication claim sufficient for authentication as a result of including an attestation to a state of a computing environment; and
provide the authentication claim for authentication of the identity.

15. The non-transitory computer-readable storage medium of clause 14, wherein the authentication claim is generated prior to receipt of the input indicating the user selection of the representation.

16. The non-transitory computer-readable storage medium of clauses 14 or 15, wherein the instructions further include instructions that, when executed by the one or more processors, cause the computer system to generate the authentication claim using a private cryptographic key corresponding to a public cryptographic key usable to verify authenticity of the authentication claim.

17. The non-transitory computer-readable storage medium of any of clauses 14 to 16, wherein the instructions that cause the computer system to obtain the attestation further cause the computer system to communicate with a cryptographic module of the computer system to receive the attestation.

18. The non-transitory computer-readable storage medium of any of clauses 14 to 17, wherein the selection of the representation is a result of a drag and drop operation using a graphical user interface.

19. The non-transitory computer-readable storage medium of any of clauses 14 to 18, wherein the authentication claim is based at least in part on at least one long-term credential associated with the user.

20. The non-transitory computer-readable storage medium of any of clauses 14 to 19, wherein the attestation further encodes information based at least in part on one or more sensors of the computer system.

21. The non-transitory computer-readable storage medium of any of clauses 14 to 20, wherein:
the instructions, when executed by the one or more processors, further cause the computer system receive a policy and verify compliance by the computing environment with the received policy; and
the attestation further indicates compliance with the received policy.

22. The non-transitory computer-readable storage medium of any of clauses 14 to 21, wherein the attestation is cryptographically verifiable.

23. A computer-implemented method, comprising:
under the control of one or more computer systems configured with executable instructions,
displaying a graphical user interface that makes available for selection a plurality of graphical representations of authentication claims, the plurality of graphical representations associated with a representation of an authentication claim corresponding to a set of actions for authenticating an identity of a user with a service provider system;
receiving, from an input device, user input indicating a user selection from the plurality of graphical representations of the graphical representation and a request to authenticate an identity of the user with the service provider system;
performing the set of actions, the set of actions including obtaining information from the user that is necessary for at least one mode of authentication;
generating the authentication claim based at least in part on the obtained information such that the generated authentication claim is sufficient for authentication with the service provider system; and
providing the authentication claim to the service provider system.

24. The computer-implemented method of clause 23, wherein the information further comprises a one-time password from a one-time password token device.

25. The computer-implemented method of clauses 23 or 24, wherein the information further comprises biometric information from the user.

26. The computer-implemented method of any of clauses 23 to 25, wherein the information is obtained after the user selection of the graphical representation.

27. The computer-implemented method of any of clauses 23 to 26, wherein:
obtaining the information further includes receiving the information from a device separate from the one or more computer systems; and
the received information further comprises a digital signature generated based at least in part on a cryptographic key associated with the device.

28. The computer-implemented method of any of clauses 23 to 27, wherein the user input further corresponds to a drag and drop operation involving the graphical representation using the graphical user interface.

29. A system, comprising:
one or more processors; and
memory including executable instructions that, when executed by the one or more processors, cause the system to:
provide a set of representations for selection via an interface, the set of representations of authentication claims including a representation of an authentication claim that corresponds to a set of actions performable to authenticate an identity with a service provider system;
detect a selection of the representation from the set of representations;
perform the set of actions corresponding to the selected representation to obtain the authentication claim; and
provide the obtained authentication claim for authentication.

30. The system of clause 29, wherein the set of actions further includes obtaining proof of possession by the user of an item that is separate from the system.

31. The system of clause 30, wherein the proof of possession further comprises biometric information.

32. The system of clauses 30 or 31, wherein the proof further comprises a proposed solution to a test configured to distinguish human operators from automated agents.

33. The system of any of clauses 30 to 32, wherein the item further comprises a physical item.

34. The system of any of clauses 30 to 33, wherein the instructions, when executed by the one or more processors, further cause the system to communicate with another system to obtain the proof.

35. The system of any of clauses 29 to 34, wherein the interface is a graphical user interface and the selected representation further comprises a graphical representation of the authentication claim.

36. A non-transitory computer-readable storage medium having stored thereon executable instructions that, when executed by one or more processors of a computer system, cause the computer system to at least:
detect input corresponding to a selection, via an interface and from a plurality of representations of authentication claims, of a representation of an authentication claim corresponding to a set of actions for authenticating an identity of a user and a request to provide the authentication claim corresponding to the representation; and
as a result of detecting the input, perform the set of actions including providing the authentication claim for use in authentication, the authentication claim based at least in part on first authentication information usable for authentication with another system.

37. The non-transitory computer-readable storage medium of clause 36, wherein the instructions, when executed by the one or more processors, further cause the computer system to receive input through a user input device of the computer system to obtain second authentication information and generate the authentication claim based at least in part on the second authentication information.

38. The non-transitory computer-readable storage medium of clause 37, wherein the second authentication information further comprises a personal identification number of the user.

39. The non-transitory computer-readable storage medium of clauses 37 or 38, wherein the instructions, when executed by the one or more processors, further cause the computer system to obtain one or more sensor measurements to obtain the second authentication information 40. The non-transitory computer-readable storage medium of any of clauses 37 to 39, wherein the first authentication information further comprises a username and a password for the user.

41. The non-transitory computer-readable storage medium of any of clauses 36 to 40, wherein:

the representation further comprises a graphical representation of the set of actions; and the interface further comprises a graphical user interface; and the input further comprises manipulation of the input comprises manipulation of the graphical representation via the graphical user interface.

42. The non-transitory computer-readable storage medium of any of clauses 36 to 41, wherein the plurality of representations further comprises individual representations corresponding to different service provider systems.

43. The non-transitory computer-readable storage medium of any of clauses 36 to 42, further comprising instructions that, when executed by the one or more processors, cause the computer system to:

receive input for provisioning the representation, the input for provisioning the representation defining, at least in part, the set of actions; and as a result of receiving the input for provisioning the representation, make the representation available for selection by the interface to enable the representation to be selected to cause the system to submit the authentication claim.

44. The non-transitory computer-readable storage medium of any of clauses 36 to 43, further comprising instructions that, when executed by the one or more processors, cause the computer system to:

receive, from another computer system, an instruction to remove the representation; and as a result of receiving the input for provisioning the representation, making the representation unavailable for selection by the interface.

45. The non-transitory computer-readable storage medium of any of clauses 36 to 44, wherein:

the input further indicates a proper subset of a set of permissions associated with the stored first authentication information; and the provided authentication claim is usable by another user for accessing at least one computing resource in accordance with the indicated proper subset of the set of permissions.

46. The non-transitory computer-readable storage medium of any of clauses 36 to 45, further comprising instructions that, when executed by the one or more processors, cause the computer system to:

receive, from another computer system, a revocation communication corresponding to at least the representation of the authentication claim; and as a result of receiving the revocation communication, remove the ability to generate the authentication claim.

47. The non-transitory computer-readable storage medium of any of clauses 36 to 46, further comprising instructions that, when executed by the one or more processors, cause the computer system to:

receive, from another computer system, one or more communications indicating a change to the set of representations of authentication claims; and update the user interface to modify the set of representations in accordance with the received one or more communications.

48. A computer-implemented method, comprising:

under the control of one or more computer systems configured with executable instructions, generating a graphical user interface that makes available for selection one or more graphical representations of authentication claims, at least a subset of the one or more graphical representations of the authentication claims corresponding to an identity;

receiving first input corresponding to a first user via the graphical user interface indicating:

a selection, from the one or more graphical representations of authentication claims, of a graphical representation of an authentication claim;

one or more parameters for the authentication claim to be generated based at least in part on authentication information associated with the first user; and a request to delegate access to one or more computing resources;

generating the authentication claim in accordance with the one or more parameters; and providing the generated authentication claim to enable second input corresponding to a second user to access the one or more computing resources using the generated authentication claim.

49. The computer-implemented method of clause 48, wherein the generated authentication claim further provides the second user a first amount of access that is less than a second amount of access available to the first user using the authentication information associated with the first user.

50. The computer-implemented method of clauses 48 or 49, wherein the authentication information associated is sufficient to generate a first authentication claim usable by the first user to obtain access to the one or more computing resources.

51. The computer-implemented method of any of clauses 48 to 50, wherein:

the one or more parameters further indicate a limited amount of time of validity for the authentication claim; and the authentication claim is generated to become unusable to obtain access to the one or more computing resources in accordance with the limited amount of time.

52. The computer-implemented method of any of clauses 48 to 51, wherein the one or more parameters for the authentication claim further specify one or more limits on use of the authentication claim.

53. The computer-implemented method of any of clauses 48 to 52, wherein providing the generated authentication claim to the second user further comprises transmitting the generated authentication claim to the second user over a network.

54. A system, comprising:

one or more processors; and memory including instructions that, when executed by the one or more processors, cause the system to:

provide an interface that makes available for selection one or more representations of authentication claims, at least a subset of the set of representations associated with an identity;

receive first input indicating a selection, from the one or more representations of authentication claims, of a representation of an authentication claim associated with authentication information for the first user; and as a result of the selection of the representation of the authentication claim, generate an authentication claim usable by a second user to obtain a subset of access obtainable using the authentication information for the first user.

55. The system of clause 54, wherein the interface further comprises a graphical user interface and the representation of the authentication claim comprises a graphical representation of the authentication claim.

56. The system of clauses 54 or 55, wherein the instructions, when executed by the one or more processors, further cause the system to:

receive input indicating a request to use the generated authentication claim for authentication; and provide access as a result of the generated authentication claim being valid.

57. The system of any of clauses 54 to 56, wherein the selected representation of the authentication claim is selectable by the first user to cause a corresponding authentication claim to be submitted for the first user.

58. The system of any of clauses 54 to 57, wherein the subset of access obtainable using the authentication claim further comprises a proper subset of access obtainable using the authentication information.

59. The system of any of clauses 54 to 58, wherein:

the interface further includes a test configured to distinguish human operators from automated agents;

at least a portion of the received user input further corresponds to a proposed solution to the test; and the instructions further include instructions that, when executed by the one or more processors, cause the system to verify the proposed solution as correct as a requirement for generating the authentication claim.

60. The system of any of clauses 54 to 59, wherein:

the instructions that cause the system to generate the authentication claim, when executed by the one or more processors, further cause the system to generate multiple authentication claims that are individually usable by the second user to obtain a subset of access obtainable using the authentication information; and individual generated authentication claims of the multiple generated authentication claims are individually usable for designated amounts of time.

61. A non-transitory computer-readable storage medium having stored thereon executable instructions that, when executed by one or more processors of a computer system, cause the computer system to at least:

provide for selection one or more representations of authentication claims, the one or more representations of authentication claims comprising a first representation of a first authentication claim that is generated based at least in part on another authentication claim, the first authentication claim being usable for authentication to authenticate an identity to obtain at least some access for which the other authentication claim is usable;

detect a selection of the first authentication claim; and cause the first authentication claim to be used for authentication as a result of detecting the selection.

62. The non-transitory computer-readable storage medium of clause 61, wherein:

the one or more representations of authentication claims are provided in a graphical user interface.

63. The non-transitory computer-readable storage medium of clauses 61 or 62, wherein said at least some access is for a collection of multimedia resources.

64. The non-transitory computer-readable storage medium of clause 63, wherein multimedia resources further comprise at least two of audio, video, an electronic book, or an electronic game.

65. The non-transitory computer-readable storage medium of any of clauses 61 to 64, wherein the instructions, when executed by the one or more processors, further cause the computer system to receive the first authentication claim from another system.

66. The non-transitory computer-readable storage medium of any of clauses 61 to 65, wherein the first authentication claim is valid for a limited time.

67. The non-transitory computer-readable storage medium of any of clauses 61 to 66, wherein the first authentication claim is usable to obtain at least some access for an amount of time encoded in the first authentication claim.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    generating, based at least in part on data associated with a first user, a structured collection of information, the data being usable for at least one mode of authentication with a service provider system;
    storing the structured collection such that the structured collection is usable at least in part to authenticate an identity of the first user with the service provider system as a result of selection, by a second user, of a graphical representation of the structured collection from a graphical user interface;
    displaying the graphical user interface, the graphical user interface making available for selection a plurality of graphical representations of structured collections sufficient for authentication with service provider systems to which the plurality of graphical representations corresponds; and
    in response to receiving the selection, by the second user, of the graphical representation from an input device, authenticating the identity of the first user by:
        obtaining the structured collection; and
        performing a set of actions associated with the structured collection that includes providing the data associated with the first user to the service provider system.

2. The computer-implemented method of claim 1, wherein the data comprises a one-time password from a one-time password token device.

3. The computer-implemented method of claim 1, wherein the data comprises biometric information from the first user.

4. The computer-implemented method of claim 1, wherein the data is obtained after the user selection of the graphical representation.

5. The computer-implemented method of claim 1, wherein:
    the data is obtained from the first user by receiving the data from a device separate from the service provider system; and
    the data received comprises a digital signature generated based at least in part on a cryptographic key associated with the device.

6. The computer-implemented method of claim 1, wherein the user selection corresponds to a drag and drop operation involving the graphical representation using the graphical user interface.

7. A system, comprising:
    one or more processors; and
    memory including executable instructions that, as a result of execution by the one or more processors, cause the system to:
        generate, based at least in part on data obtained from a first user, a structured collection of information, the data being usable for at least one mode of authentication with a service provider system;
        store the structured collection such that the structured collection is usable at least in part to authenticate an identity of the first user with the service provider system as a result of selection, by a second user, of a graphical representation of the structured collection from a graphical user interface;
        display the graphical user interface, the graphical user interface making available for selection a plurality of graphical representations of structured collections sufficient for authentication with service provider systems to which the plurality of graphical representations corresponds; and
        in response to receipt of the selection, by the second user, of the graphical representation from an input device, authenticate the identity of the first user to further cause the system to:
            obtain the structured collection; and
            perform a set of actions associated with the structured collection that includes providing the data obtained from the first user to the service provider system.

8. The system of claim 7, wherein the set of actions includes obtaining proof of possession by a user of an item that is separate from the system.

9. The system of claim 8, wherein the proof of possession comprises biometric information.

10. The system of claim 8, wherein the proof comprises a proposed solution to a test configured to distinguish human operators from automated agents.

11. The system of claim 8, wherein the item is a physical item.

12. The system of claim 8, wherein the executable instructions cause the system to communicate with another system to obtain the proof.

13. The system of claim 7, wherein the selection, by the second user, corresponds to a drag and drop operation involving the graphical representation using the graphical user interface.

14. A non-transitory computer-readable storage medium having stored thereon executable instructions that, as a result of execution by one or more processors of a computer system, cause the computer system to at least:
generate, based at least in part on data obtained from a first user, a structured collection of information, the data being usable for at least one mode of authentication with a service provider system;
store the structured collection such that the structured collection is usable at least in part to authenticate an identity of the first user with the service provider system as a result of selection, by a second user, of a representation of the structured collection from a graphical user interface;
display an interface, the graphical user interface making available for selection a plurality of representations of structured collections sufficient for authentication with service provider systems to which the plurality of representations corresponds; and
in response to receipt of the selection, by the second user, of the representation from an input device, authenticate the identity of the first user, further causing the computer system to:
obtain the structured collection; and
perform a set of actions associated with the structured collection that includes providing the data obtained from the first user to the service provider system.

15. The non-transitory computer-readable storage medium of claim 14, wherein:
the executable instructions further cause the computer system to receive input from the second user, through a user input device of the computer system to obtain second authentication information; and
the executable instructions that generate the structured collection further generate the structured collection based at least in part on the second authentication information.

16. The non-transitory computer-readable storage medium of claim 15, wherein the second authentication information comprises a personal identification number of the second user.

17. The non-transitory computer-readable storage medium of claim 15, wherein the executable instructions further cause the computer system to obtain one or more sensor measurements to obtain the second authentication information.

18. The non-transitory computer-readable storage medium of claim 15, wherein the second authentication information comprises a username and a password for the second user.

19. The non-transitory computer-readable storage medium of claim 14, wherein:
the representation comprises a graphical representation of the set of actions;
the interface is a graphical user interface; and
the user selection is indicated by manipulation of the graphical representation via the graphical user interface.

20. The non-transitory computer-readable storage medium of claim 14, wherein the plurality of representations comprises individual representations corresponding to different service provider systems.

21. The non-transitory computer-readable storage medium of claim 14, further comprising instructions that, as a result of execution by the one or more processors, cause the computer system to:
receive input for provisioning the representation, the input for provisioning the representation defining, at least in part, the set of actions; and
as a result of receiving the input for provisioning the representation, make the representation available for selection via the interface.

22. The non-transitory computer-readable storage medium of claim 14, further comprising instructions that, as a result of execution by the one or more processors, cause the computer system to:
receive, from another computer system, an instruction to remove the representation; and
as a result of obtaining the data from the first user, making the representation unavailable for selection via the interface.

23. The non-transitory computer-readable storage medium of claim 14, wherein:
the data further indicates a proper subset of a set of permissions associated with the at least one mode of authentication; and
the structured collection is usable by another user for accessing at least one computing resource in accordance with the proper subset of the set of permissions indicated.

24. The non-transitory computer-readable storage medium of claim 14, further comprising instructions that, as a result of execution by the one or more processors, cause the computer system to:
receive, from another computer system, a revocation communication corresponding to at least the representation of the structured collection; and
as a result of receiving the revocation communication, remove an ability to generate the structured collection.

25. The non-transitory computer-readable storage medium of claim 14, further comprising instructions that, as a result of execution by the one or more processors, cause the computer system to:
receive, from another computer system, one or more communications indicating a change to the plurality of representations of the structured collections; and
update the interface to modify the plurality of representations in accordance with the one or more communications received.

* * * * *